(12) United States Patent
Olsson et al.

(10) Patent No.: US 7,751,499 B2
(45) Date of Patent: Jul. 6, 2010

(54) DESPREADING-ON-DEMAND FOR USE IN SPREAD SPECTRUM RECEIVERS

(75) Inventors: Henrik Olsson, Spanga (SE); Bjorn Forsberg, Stockholm (SE); Georg Mesko, Jarfalla (SE); Erik Nordhamn, Storvreta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 746 days.

(21) Appl. No.: 11/638,701

(22) Filed: Dec. 14, 2006

(65) Prior Publication Data

US 2007/0189365 A1    Aug. 16, 2007

Related U.S. Application Data

(60) Provisional application No. 60/750,068, filed on Dec. 14, 2005.

(51) Int. Cl.
H04L 27/00    (2006.01)

(52) U.S. Cl. ................................................ 375/316

(58) Field of Classification Search ......... 375/130–153, 375/316, 349
See application file for complete search history.

(56) References Cited

U.S. PATENT DOCUMENTS

| 5,544,156 A | 8/1996 | Teder et al. ............ 370/18 |
| 6,222,875 B1 * | 4/2001 | Dahlman et al. ......... 375/130 |
| 2005/0232380 A1 * | 10/2005 | Valio et al. .............. 375/343 |

FOREIGN PATENT DOCUMENTS

| EP | 1 265 373 | 12/2002 |
| WO | WO 01/50620 A1 | 7/2001 |
| WO | WO 03/039019 A1 | 5/2003 |

OTHER PUBLICATIONS

ISA Written Opinion dated May 24, 2007, (8 pages) and Search Report (5 pages).
Lange et al., "A Software Solution for Chip Rate Processing in CDMA Wireless Infrastructure"; IEEE Communications magazine, Feb. 2002, p. 163, col. 2, line 19; p. 165, col. 2, line 22 fig. 2.

(Continued)

*Primary Examiner*—Sam K Ahn
(74) *Attorney, Agent, or Firm*—Nixon & Vanderhye P.C.

(57) ABSTRACT

A flexible and resource-efficient despreading-on-demand (DoD) technique is described where only channels that actually contain data to be despread are despread, and only a single despreading operation need be performed using the actual spreading factor associated with that data. In one example, the data portion of the received signal is buffered for a frame so that an associated transport format, including the actual spreading factor, can be determined before the data is despread. The data is buffered in a memory at a first rate and then subsequently read out at a second rate that is considerably faster than the first rate. The fast data read-out allows despreading at a high rate so that the despread data symbols from the buffered frame are available for further processing shortly after the last sample belonging to the frame has been received.

30 Claims, 14 Drawing Sheets

OTHER PUBLICATIONS

Byrne, Charles L., "Signal Processing: A Mathematical Approach", AK Peters, Ltd., 2005, pp. 3-4.

Second Written Opinion of the International Preliminary Examining Authority for International Application No. PCT/SE2006/050573, 2008.

Balch, Complete Digital Design: A Comprehensive Guide to Digital Electronics and Computer System Architecture, McGraw-Hill Professional Publishing; ISBN: 97-0/-143347-1; 2003, pp. 94-96.

* cited by examiner

DESPREADING-ON-DEMAND FOR USE IN SPREAD SPECTRUM RECEIVERS

RELATED APPLICATION

This application claims priority from commonly-assigned, U.S. provisional patent application No. 60/750,068, filed Dec. 14, 2005, the contents of which are incorporated herein by reference.

TECHNICAL FIELD

The technical field relates to mobile radio communications, and more particularly, to despreading received signals in a code division multiple access (CDMA) based communications systems.

BACKGROUND

FIG. 1 illustrates an example mobile communications network 10. A radio access network (RAN) 12 is coupled to one or more core networks 14, which in turn, is(are) coupled to one or more external networks 16, like the Internet, the PSTN, ISDN, etc. The radio access network 12 includes, for example, one or more radio network controllers (RNCs) 18 that may communicate signaling and/or traffic to each other. Each RNC 18 controls one or more radio base stations (BSs) 20. Base stations may also be referred to as Node B's or access points. Each base station 20 transmits information over an "air" or wireless interface in one or more corresponding coverage areas called cells via a variety of downlink radio channels. Each base station 20 also receives uplink communications over the air interface from user equipments (UEs) (22) in or near that base station's cell(s) via one or more uplink radio channels. UEs are often referred to as mobile stations, mobile radios, and mobile terminals and include, for example, cell phones, PDAs, laptop computers, and other devices for wireless communication.

In mobile radio communications, a variety of different type channels may be used to convey different types of information. For example, channels may be defined as control/signaling channels or traffic channels, or they may be characterized as dedicated or common/shared channels. In third generation, Wideband-code division multiple access (WCDMA) cellular communications systems, the physical channels are classified in many ways. Examples of different type radio channels are conceptually represented in FIG. 1 including: one or more dedicated data channels like a Dedicated Channel (DCH), Enhanced Dedicated Channel (E-DCH), or Dedicated Physical Data Channel (DPDCH), etc., one or more dedicated control channels like a Dedicated Physical Control Channel (DPCCH), one or more shared data channels like a Random Access Channel (RACH), and a high speed shared channels like a High Speed-Downlink Shared Channel (HS-DSCH), an Enhanced-Dedicated Physical Control Channel (E-DPCCH), or a High Speed-Dedicated Physical Control Channel (HS-DPCCH).

From one perspective, the 3GPP UMTS FDD standard has evolved in three steps when it comes to substantial changes related to the physical layer (L1) processing. First, in Release R99, the basics of WCDMA were established, and the dedicated channel (DCH) was proposed as the transport channel for both circuit-switched and packet-switched data. The R99 physical channel for the DCH is called a dedicated physical channel (DPCH) and includes both a dedicated physical data channel (DPDCH) and a dedicated physical control channel (DPCCH). The symbols on the uplink (UL) DPDCH are direct-sequence spread by a channelization code $c_{ch}$ with a spreading factor (SF) between 4 and 256, depending on the size of the data payload. The bits of a spreading code are called chips. If Tb represents the period of one data bit and Tc represents the period of one chip, the chip rate, 1/Tc, is often used to characterize a spread spectrum transmission system like WCDMA. The spreading factor (sometimes called processing gain) is defined as the ratio of the information bit duration over the chip duration: SF=Tb/Tc. In short, the spreading factor represents the number of chips used to spread one data bit. In general, a higher the spreading factor (the more chips in the spreading code), the lower the bandwidth and data rate. A higher spreading factor results in a higher signal-to-interference ratio of the despread signal in the receiver given a certain power of the spread signal. Conversely, higher data rates (high bandwidth requirements) use a lower spreading factor. Even higher bandwidth/data rate can be obtained by spreading data to more than one spreading code. A higher spreading factor also means that more spreading codes can be allocated on the same frequency channel.

A receiver for processing direct sequence spread spectrum signals that are received over a multi-path fading channel is illustrated in FIG. 2. The structure up to and including the Rake demodulator 46 is usually referred to as a Rake receiver. The Rake receiver is a diversity combiner exploiting the time diversity provided by the multi-path radio channel. The diversity branches are referred to as Rake fingers and are indicated as 41a, 41b, . . . 41n. Each Rake finger works on a differently delayed version of a composite (multiple UE) baseband signal. Each Rake finger's corresponding delay and downsample block 42a, 42b, . . . 42n first delays the data, mathematically represented as $z^{\tau-T}$, and then downsamples the data to the chip-rate, i.e., one times oversampling (1×OS). The product of a scrambling code $c_{scr}$ corresponding to a particular UE and a channelization code $c_{ch}$ corresponding to a particular traffic channel is multiplied in corresponding multiplier 43a, 43b, . . . , 43n with the delayed and downsampled baseband composite signal to generate a complex-valued, UE-specific symbol stream at each Rake finger. The delayed composite signal is descrambled and despread to a UE-specific, complex-valued symbol stream at the rate that the composite signal is received. As the last stage of the Rake finger despreader, each rake finger's UE-specific, complex-valued symbol stream is integrated and "dumped" (44a, 44b, . . . 44n) over SF chips to produce a UE-specific, per-rake-finger user data symbol stream. The "integrate and dump over SF chips" operation corresponds to accumulating a number of consecutive symbols equal to the spreading factor and then outputting the accumulated sum. Thereafter, the accumulator is reset, and the next SF consecutive symbols are accumulated, etc. Determining which SF symbols to integrate and dump is a synchronization task for the Rake receiver and is not necessary for an understanding of the technology described here. The symbols generated from each of the rake fingers are channel-compensated in a Rake demodulator 46 by multiplying, at a corresponding multiplier 52a, 52b, . . . 52n, each user data symbol with a corresponding channel estimate $h_a(t)$, $h_b(t)$, . . . , $h_n(t)$. The channel-compensated symbols from all the Rake fingers are combined into one symbol stream received from a UE in a Rake combiner 53. The output of the Rake combiner 53 includes "soft" symbol values used in a decoder 58 to generate the actual data received from the UE.

An example of air-timing relations between various physical channels is illustrated in FIG. 3. The DPDCH is divided into 10 msec radio frames. Each radio frame is associated with 15 slots on the DPCCH. Each slot contains includes a 10-bit code word, with typically six pilot bits, two Transport Format Combination Indicator (TFCI) bits, and two transmit power control (TPC) bits. Significantly, the transport format used for the DPDCH is not explicitly available until the whole frame has been received and demodulated. Each TFCI is 30 bits long, but each slot only provides two of the 30 TFCI bits. As a result, all 15 slots in the frame must be decoded in order to obtain and then concatenate together all 30 TFCI bits.

When high speed data packet access (HSDPA) was introduced in the downlink, a new physical control channel was created in the uplink (UL) the HS-DPCCH. After that, enhanced uplink (E-UL) was standardized for the uplink to decrease user data latency, increase user data peak rates, and increase the air interface capacity. Another objective of enhanced uplink is to permit more users to transmit at high peak rates. A new transport channel, E-DCH, was introduced with release R6 for the implementation of E-UL. The physical channel for the E-DCH remains the DPCH which can either be a carrier of a pure E-DCH, mixed E-DCH and DCH, or a pure DCH. To support high peak rates, spreading factors down to 2 and "multi-code" are used. Multi-code means that more then one spreading code is assigned to spread and transmit user data. In addition to the introduction of very low spreading factors and multi-code, a new physical control channel, E-DPCCH, was introduced.

The release R6 WCDMA UL dedicated physical channel (DPCH) supports up to four types of physical control and data channels including:

DPCCH—carries in a minimal configuration pilots mainly for channel characterization, TPC bits for DL power control, and TFCI bits for transport format coding.

HS-DPCCH—carries ACK/NAK for the L2 HARQ process in the DL HSDPA and channel quality information (CQI) for the DL HSDPA air interface scheduling.

E-DPCCH—carries mainly E-TFCI for E UL transport format information but also other L2 control data for the enhanced UL channels.

DPDCH—carries the L1 data to be demultiplexed into transport channel(s). Multi-code in R6 means that up to 4 DPDCHs can be set up.

The timings of the new physical channels and of the modified DPDCH for the E-DCH are illustrated in FIGS. 4 and 5. FIG. 4 shows WCDMA R6 DPCH subchannel components for a 2 ms Transmission Time Interval (TTI) E-DCH: DPCCH, DPDCH, and E-DPCCH. As with the format shown in FIG. 3, the transport format shown in FIG. 4 suffers from the drawback that the spreading factor used for the DPDCHs carried on the E-DPCCH is not explicitly available until the entire E-DPCCH subframe has been received and demodulated.

FIG. 5 shows WCDMA R6 DPCH subchannel components for a 10 ms TTI E-DCH: DPCCH, DPDCH, and E-DPCCH. The timing of the HS-DPCCH is not illustrated since it is not relevant to the despreading of the DPDCHs. The transport format used for the DPDCHs is mapped to a 2 ms E-DPCCH subframe and repeatedly transmitted 5 times. For air interface efficiency reasons, the E-DPCCH energy required for successful TFCI detection is spread out over all 5 subframes. Thus, not until all five subframes have been soft-combined can the TFCI be decoded from the E-DPCCH with a reasonably high probability of correct decoding. Thus again, the problem is that the transport format which includes the spreading factor $SF_{actual}$ used for the DPDCHs is not explicitly available until the whole 10 ms frame has been received.

This problem of the transport format used for the DPDCHs not being explicitly available until the whole frame has been received prevents use of the straight-forward Rake receiver illustrated in FIG. 2 because the accumulation length in the integrate-and-dump units is not available until the whole frame has been received. In other words, the accumulation length should be set to the actually used spreading factor, $SF_{actual}$. One way to address this problem is to perform an initial pre-despreading operation followed by a final despreading operation to convert the direct sequence spread data signal from a broadband chip sequence (chip rate) to a narrowband BPSK-modulated DPDCH data stream (bit rate). So the despreading of the DPDCH data occurs in two steps: (1) pre-despread the composite data signal as it arrives with a pre-configured spreading factor $SF_{pre}$, and then (2) finally despread the data signal using a final spreading factor $SF_{final}$, which is derived from the $SF_{actual}$ extracted from the TFCI for that data frame using the following relation:

$$SF_{actual}=SF_{pre}*SF_{final}$$

Pre-despreading without knowledge of the spreading factor is possible in WCDMA due to the construction of the OVSF channelization codes used to separate the physical channels in UL. When viewed over a whole frame or subframe, a particular DPDCH channelization code is actually the same chip sequence for all spreading factors between 4 and 256. However, this is not valid for the SF2 code for E-DCH where multi-code is allowed.

In any event, the actual spreading factor for the frame, $SF_{actual}$, is not known until after TFCI-decoding for the entire frame is complete. As the equation above indicates, the value of the final spreading factor for the frame $SF_{final}$ depends on the actual spreading factor for the frame, $SF_{actual}$. Consequently, the predespread data needs to be buffered until it can be finally despread. This buffering has disadvantages.

To better understand those disadvantages, reference is made to a receive processor 40 shown in FIG. 6. An oversampled, UE composite signal (includes signals from multiple UEs) from a base station or other receiver antenna is pre-despread in N RAKE finger processing units 41a, 41b, ..., 41n. As explained for FIG. 2, in each pre-despreader finger 41, the composite signal is first delayed for an appropriate time corresponding to the rake finger's channel tap delay, $z_{\tau-T}$, downsampled to the chip-rate (1 ×OS), and then multiplied by the UE's scrambling code $c_{scr}$ and channelization codes $c_{ch}$ in a multiplier 43 to extract a UE-specific signal from the composite signal, and the output of the multiplier 43 is integrated in an integrate and dump block 44. The output from each finger is stored in a pre-despread Rake finger delay buffer 45 which delays the one UE's data a sufficient time to allow functions like channel estimation to be determined before passing on the data. A Rake demodulator 46 like that shown in FIG. 2 receives the delayed data along with channel estimates from a channel estimator 55 and performs channel compensation and maximum ratio combining of all the N rake fingers' pre-despread DPDCH symbols corresponding to one UE from the buffer 45 to generate pre-despread data for the one UE which is then stored in a pre-despread, first-in-first-out (FIFO) buffer 48.

For the one UE, the control information for the DPDCH data frame is processed in a parallel path to extract the transport format information that includes among other things the appropriate spreading factor for the DPDCH data frame. A control channel (e.g., DPCCH/E-DPCCH) despreader 54 and demodulator 56 despreads the wideband composite chip stream corresponding to the DPDCH data frame into a narrowband bit stream using the one UE's scrambling code and a control channelization code different than that used to pre-despread the UE composite signal. The TFCI for the UE for this frame is extracted from the bit stream in block 57 and decoded in order to determine the final spreading factor $SF_{final}$ used for that frame. A final despreader in the form of another integrate and dump block 50 uses the final spreading factor $SF_{final}$ to finally despread the pre-despread data stored in the pre-despread FIFO buffer 48. The finally despread data bits for the one UE, which correspond to "soft" symbol information, are then decoded in decoder 58 into actual data received from the one UE, which are sent on for further processing and transmission to the RNC.

This two-stage despreading is possible because the spreading (channelization) codes $c_{ch}$ for the DPDCH in the 3GPP standard were carefully chosen. The spreading factor $SF_{pre}$ is predefined for a certain radio access bearer and corresponds to the lowest allowed spreading factor for the radio access bearer. When the pre-despread spreading factor $SF_{pre}$ and actual spreading factor $SF_{actual}$ are close, the amount of extra, unnecessary data stored in the pre-despreading buffer need not be that large. But there are situations where there is a significant difference between the pre-determined spreading factor $SF_{pre}$ and the actual spreading factor $SF_{actual}$. In those situations, the amount of unnecessarily despread data to be buffered can be significant.

The buffering problem is even more troublesome with the introduction of an enhanced dedicated channel (E-DCH) in 3GPP release R6. An E-DCH can utilize between 1 and 4 DPDCHs. Table 1 below illustrates various E-DCH options.

TABLE 1

Simplified transport formats (TFs) - only SF variation considered.

| "TF" | Spreading factor and # multi-codes for DPDCH | Instantaneous DPDCH BW (kbps) |
|---|---|---|
| 0 | no data | 0 |
| 1 | SF256 | 15 |
| 2 | SF128 | 30 |
| 3 | SF64 | 60 |
| 4 | SF32 | 120 |
| 5 | SF16 | 240 |
| 6 | SF8 | 480 |
| 7 | SF4 | 960 |
| 8 | 2× SF4 | 1920 |
| 9 | 2× SF2 | 3840 |
| 10 | 2× SF2 + 2× SF4 | 5760 |

The set of allowed transport formats (TFs) for the UE is decided on two levels. The first level is set by the RNC when configuring (and reconfiguring) the UE's E-DCH. At that time, the RNC chooses a "superset" of TFs, e.g., 0 to 7 in Table 1, to maximize the UE's instantaneous DPDCH throughput, which in this example case, is a maximize of 960 kbps for SF4. From this superset, an enhanced uplink scheduler in the base station chooses a subset of TFs, and that subset is communicated to the UE in a TF grant. This TF grant can be updated regularly by the enhanced uplink scheduler. The UE then chooses a TF for transmitting each subframe from its granted TF set, depending on the amount of data it currently has queued to transmit uplink. Thus, according to the current TF grant, the UE data frame transmission scheduler may well use a lower TF than the maximum.

But in a worst case scenario, the UL despreader and demodulator 40 in the base station does not receive any information from the UE's uplink scheduler regarding the granted TFs for different UEs. It must therefore allocate despreader and buffering resources according to the RNC-configured maximum transport format, i.e., a worst case where the base station would need a buffer sized for a maximum number of possible UE's that could at one time be communicating with the base station. This is unfortunate because configuring resources assuming a worst case buffering scenario requires very large and costly buffers.

Another problem with such pre-despreading relates to Orthogonal Variable Spreading Factor (OVSF) technique used in 3GPP to generate spreading/channelization codes. The OVSF base code for the channelization code $c_{ch}$ is different for a spreading factor SF2 and a spreading factor SF4 for DPDCHs. In practice, this means that for a UE granted a transport format TF=9 (2×SF2), pre-despreaders for both the SF2 and the SF4 codes must be setup because the UE may transmit on either or both of the SF2 and SF4 DPDCH(s). This situation results in a potential 50% larger buffering need which means that suitably sized larger buffers must be provided.

SUMMARY

The problems identified above are solved using a more flexible and less resource-demanding despreading-on-demand (DoD) technique. A spread spectrum signal is received over a communications interface from one or more transmitters. A first frame of spread data received is stored in a data memory during a first time period at a first rate corresponding to the rate at which the data is received over the communications interface. The term frame is used herein as a general term to include any quantifiable portion of data. An actual spreading factor associated with the first frame of spread data is determined. During a second time period following the first time period, the first frame of spread data is read out from the data memory at a second rate substantially greater than the first rate. The readout data is then quickly despread using the determined actual spreading factor to reduce despreading delay.

In one non-limiting implementation, the control information associated with the stored first frame of spread data is despread during the first time period to determine the actual spreading factor from the despread control information. However, despreading on demand is not limited to this approach. Moreover, it may be performed on any type of data, including for example, control data.

In one example application, the transmitters may be mobile radio terminals, with the receiver apparatus being implemented in a radio base station, and the communications interface being an air or wireless interface. Alternatively, the transmitters may be base stations, and the receiver apparatus is in the mobile terminal. Application may be found for other radio transmitters and receivers. The data memory stores data received from a number of multiple transmitters as a composite signal, where the transmitted spread signals have been additively combined after being individually distorted by the radio channel. The composite signal is simply stored in the memory, and thus, the size of the data memory does not depend on the spreading factor and the number of transmitters, as will be explained in detail below.

Any suitable memory access or addressing scheme may be used, which permits data read out at the substantially greater rate. For example, the timing relative to the base station's absolute time of the first frame of spread data received from the transmitter may be used to address the first frame of spread data in the addressable memory. In one example embodiment, the data memory is an addressable memory. As one example of how to address the memory, a time is determined when the first frame of spread data received from the transmitter is stored in the addressable memory at an addressable location. The determined time is then translated to and then used as an address to read out the first frame of spread data from the addressable memory.

In one non-limiting example embodiment, the read out data is despread using multiple Rake despreading fingers to generate multiple despread outputs associated with one of the transmitters. The multiple despread outputs are combined into a single despread output corresponding to the one transmitter. The single despread output is decoded to generate data transmit by the one transmitter.

In another non-limiting example embodiment, a frame of data is stored, but only a fraction of the frame data is read out at one time and despread using a single despreading and demodulating processor for a first Rake finger to generate a first Rake finger despread output. The first Rake finger despread output fraction is temporarily stored. Then the same amount/fraction of data, taken from an address slightly offset from the first rake finger's fraction of the frame data, is read out and despread using the single despreading and demodulating processor for a second Rake finger to generate a second Rake finger despread output. The memory address offset for the second rake finger is determined from the propagation delay difference between the Rake fingers. The first and second Rake finger despread fractional outputs are combined to generate a combined Rake finger despread output and which is then stored as the new combined Rake finger despread output. The same fractional frame data is read out and despread for each remaining Rake finger to generate a corresponding Rake finger despread output. Each corresponding Rake finger despread output is combined with the stored combined Rake finger despread output to generate a current stored combined Rake finger despread output. When all Rake fingers have been combined, the first fraction combined Rake finger despread output is output to the decoder. The same procedure is repeated for the remaining fractions. The combined Rake finger despread output is decoded.

In another non-limiting example embodiment, one of the transmitters is assigned two different channelization codes having a first spreading factor and a second spreading factor. During the first time period, the first and second spreading factors are determined, e.g., from the despread control information. During the second time period following the first time period, first frame spread data are read out from the data memory at the second rate and despread using the determined first spreading factor to generate first despread data. Similarly, the first frame spread data are despread using the determined second spreading factor to generate second despread data. The first and second despread data are decoded.

In yet another non-limiting example embodiment, one of the transmitters uses quadrature multiplexing to modulate data to be transmitted as a complex signal. (But despreading-on-demand can be used with any type of modulation.) The first data corresponding to a first traffic channel is spread using a spreading code, and the spread data is mapped to a real component of the complex signal. The second data corresponding to a second traffic channel is spread using the same spreading code and mapped to an imaginary component of the complex signal. At the receiver, the read out data is despread to generate a despread complex signal. A real and an imaginary component of the despread complex signal are extracted. The extracted real component is decoded as the first data, and the extracted imaginary component is decoded as the second data.

In another non-limiting example embodiment, one of the transmitters is assigned first and second channelization codes having a first spreading factor and a second spreading factor, respectively. The one transmitter uses quadrature multiplexing to modulate data to be transmitted as a complex signal. First data corresponding to a first traffic channel is spread using the first channelization code and mapped to a real component of a first complex signal. Second data corresponding to a second traffic channel is spread using the first channelization code and mapped to an imaginary component of the first complex signal. Third data corresponding to a third traffic channel is spread using the second channelization code and mapped to a real component of a second complex signal. Fourth data corresponding to a fourth traffic channel is spread using the second channelization code and mapped to an imaginary component of the second complex signal. At the receiver, during the first time period, the first and second spreading factors are determined, e.g., from the despread control information. During the second time period following the first time period, first frame spread data are read out from the data memory at the second rate and despread using the determined first spreading factor to generate a first despread complex signal. First real and imaginary components of the first despread complex signal are extracted. The extracted first real component is decoded as the first data, and the extracted first imaginary component is decoded as the second data. The first frame spread is also despread using the determined second spreading factor to generate a second despread complex signal. Second real and imaginary components of the second despread complex signal are extracted. The extracted second real component is decoded as the third data, and the extracted second imaginary component is decoded as the fourth data.

The despreading-on-demand technology can benefit from using a despreading accelerator. The first frame of spread data received from the transmitter is stored in the data memory using a first sampling rate. The first frame of spread data is read out from the data memory, and the spread data is reconstructed at a second sampling rate that is higher than the first sampling rate. A start sample and a sampling phase are extracted from the reconstructed spread data to generate a signal at a third sampling rate lower than the first sampling rate for despreading.

When the despreading-on-demand (DoD) technique is employed for despreading data channels, e.g., DPDCH(s), only data channels that actually contain data are despread, and only a single despreading operation need be performed using the actual spreading factor associated with that data. A frame of the received composite signal is buffered for a frame period so that each UE's transport format, including the actual spreading factor, can be retrieved before the UE's data is despread. The fast data read-out allows despreading at a high rate so that the despread data symbols from the stored frame are available for further processing shortly after the last sample belonging to the frame has been received.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), using one or more digital signal processors (DSPs), and/or field programmable gate arrays (FPGAs) or the like.

Figure 7:
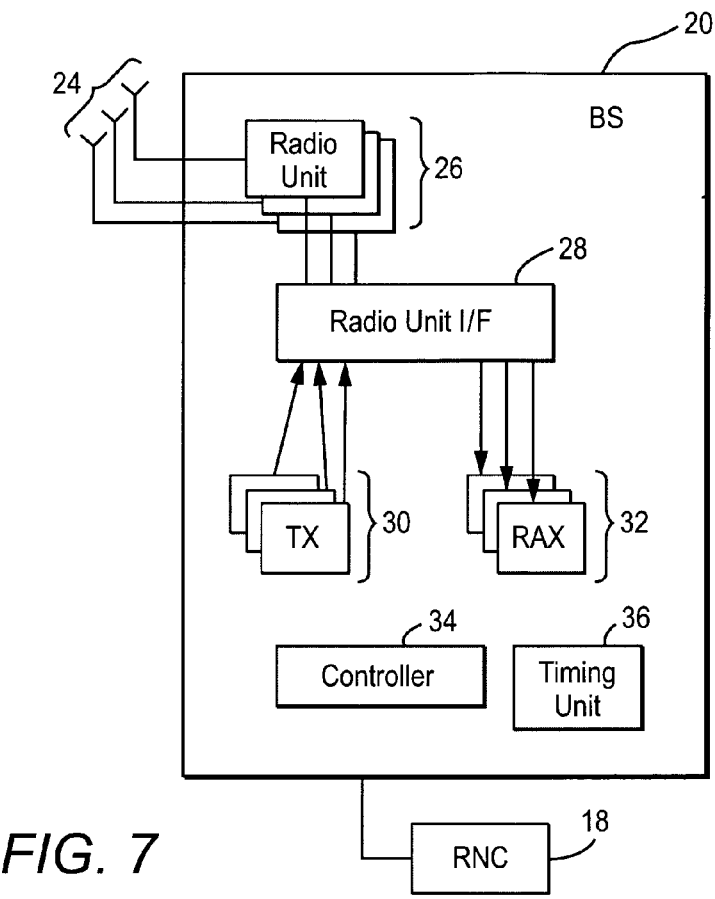
FIG. 7 is a function block diagram of a non-limiting example base station.

FIG. 7 shows a non-limiting example CDMA base station 20 in which despreading-on-demand may be used. Those skilled in the art will appreciate, however, that despreading-on-demand may be used in any direct sequence spread spectrum receiver. Radio frequency (RF) signals are received and additively combined from multiple UEs from multiple cells and/or cell sectors over representative antennas 24. Different UE signals are differentiated by unique scrambling codes. Each antenna 24 is coupled to a radio unit 26 that frequency downconverts received RF signals to baseband for delivery to a baseband receiver 32 via the radio unit interface 28. Radio units 26 also frequency upconvert baseband signals from the transmitters (TXs) 30 to RF via a radio unit interface 28.

The receiver baseband processing may be performed, for example, using a Random Access and Receiver (RAX) that processes both the uplink random access uplink channel signals and the dedicated uplink channel signals. When complex data are sent, the baseband signal receiver processing in the uplink (UL) can be viewed as a transformation of the real (I) and imaginary (Q) components of the complex I/Q data signals from all antennas in all sectors on all carrier frequencies (i.e., the composite signal) to protocol layer L2 user data flows for all UEs connected to the base station, either on a dedicated channel (e.g., a DCH or an E-DCH) or on a random access channel (RACH). Each RAX 32 includes demodulation circuitry that despreads and demodulates the dedicated channel data of up to N users/UEs from multiple cells. The demodulated data are then decoded in a decoder before being passed on to the RNC 18. A timing unit 36 provides an absolute timing reference for the base station 20. Using the absolute timing reference, a controller 34 controls and coordinates the various operations performed in the CDMA base station 20.

As described in the background, CDMA receivers may delay the pre-despread received signal for each UE approximately one frame in one or two first-in-first-out (FIFO) memory(ies) in order to allow time for the entire data frame to be received and the actual spreading factor for each UE's data frame to be determined. Then, if the pre-despreader was programmed with the pre-despreading factor $SF_{pre}$, the final despreader in the receiver can be programmed with the residual spreading factor $SF_{final}=SF_{actual}/SF_{pre}$ and generate the despread values during the subsequent frame. But as explained above, the worst case buffer memory requirements to support this despreading approach are expensive. This and other problems are overcome using the despreading-on-demand technology described below.

Figure 8:
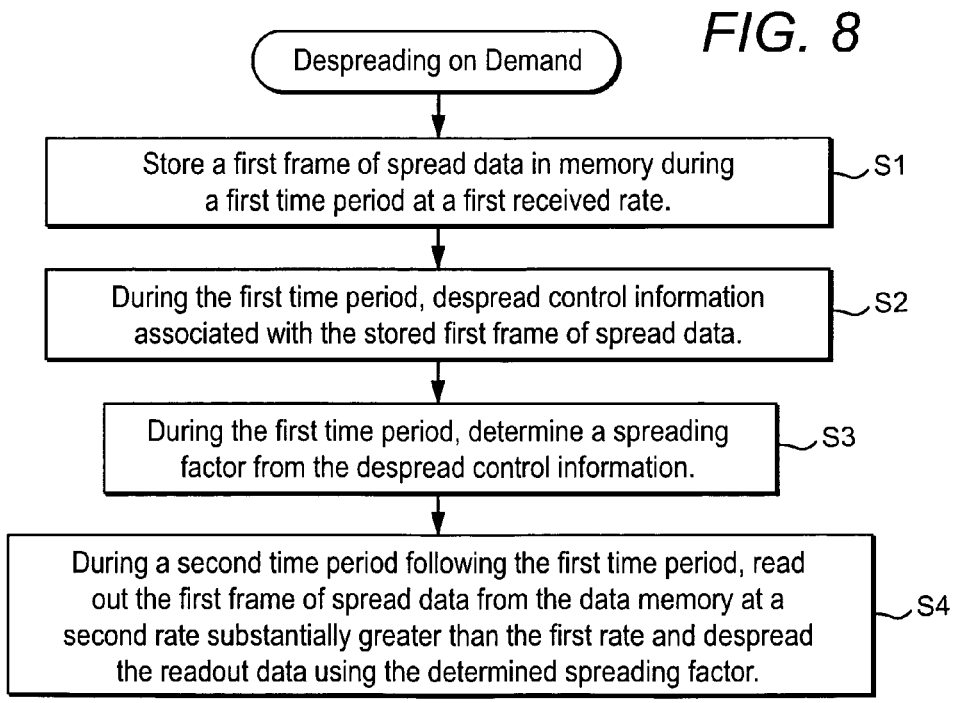
FIG. 8 is a flowchart illustrating example, non-limiting procedures for implementing despreading-on-demand.

FIG. 8 is a flowchart that illustrates non-limiting example procedures for despreading-on-demand a spread spectrum signal received over an air interface. A first frame of spread data received is stored in a data memory during a first time period at a first rate corresponding to a rate at which the data is received over the air interface (step S1). Each frame of spread data contains additively-combined, scrambling code-multiplexed data for multiple UE's, and thus, is referred to as a composite signal. Also during the first time period, control channel information associated with the stored first frame of spread data is despread (step S2), and a UE-specific spreading factor is determined from the despread control information for the data stored in the data memory (step S3). During a second time period following the first time period, the first frame of spread data is read out from the data memory at a second rate substantially greater than the first rate. The read-out data is despread using the determined spreading factor (step S4). The despreading-on-demand approach substantially reduces the amount of buffer memory required, and the despreading circuitry need only be configured to handle actually transmitted transport formats rather than worse case transport formats. The fast memory read-out means that fast despreading may be performed to ensure low latency.

Figure 9:
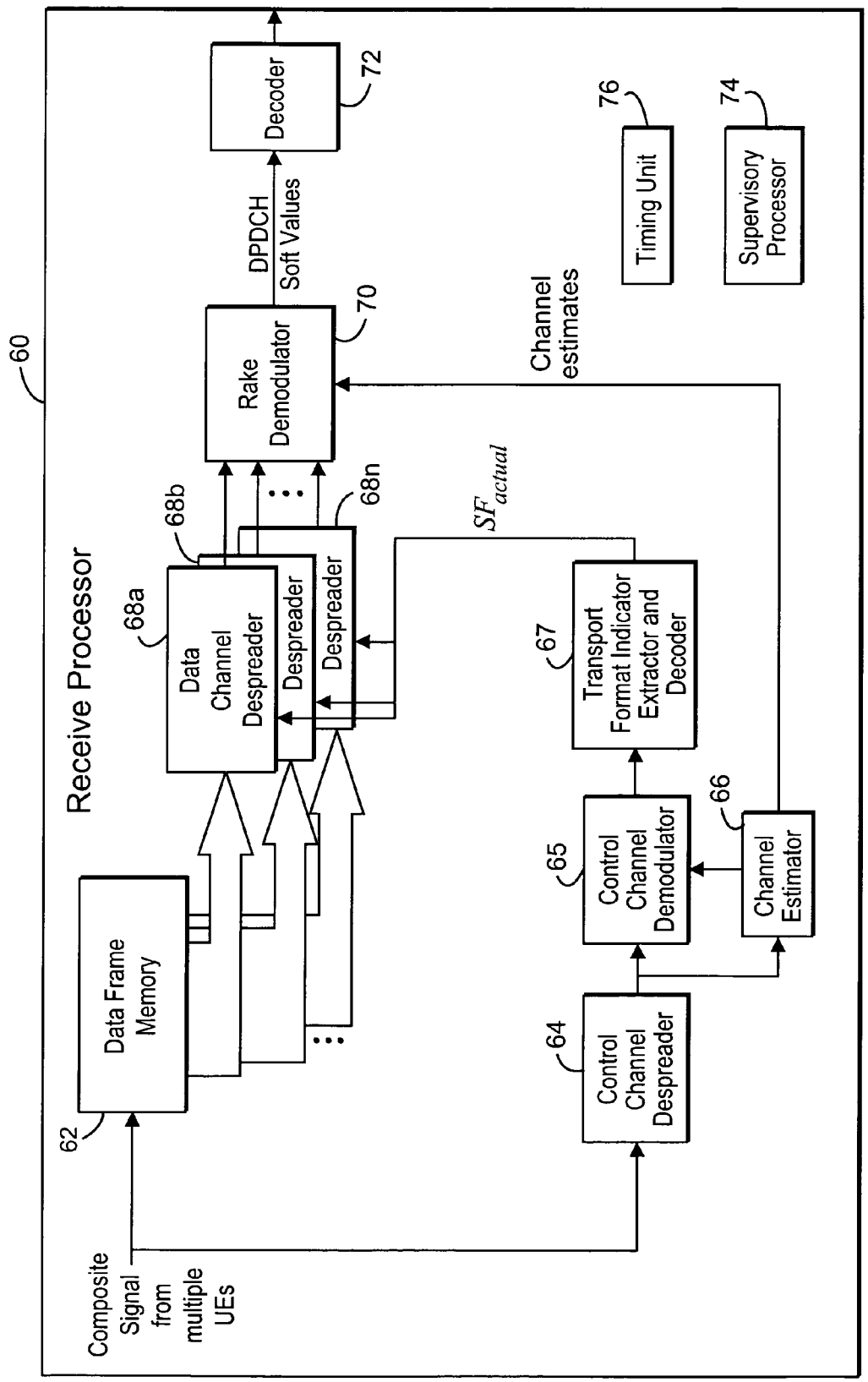
FIG. 9 is a function block diagram of a non-limiting example receive processor using despreading-on-demand.

FIG. 9 is a function block diagram of a non-limiting example receive processor 60 using despreading-on-demand that can be used in any direct sequence spread spectrum radio receiver. The description focuses, for ease of description only, on baseband receive processing in one of the RAX's in the non-limiting base station 20 shown in FIG. 7. While despreading-on-demand is applied for ease of description to despreading a data channel, despreading-on-demand may be applied to all types of channels. For example, although FIG. 9 does not show using despreading-on-demand for despreading control channel information, despreading-on-demand could be used for such.

Again, the composite signal received at the base station is the sum of multiple UE transmitted (and faded) signals plus noise. Assuming the UE's used quadrature modulation, the baseband version of this received composite signal is complex and includes both real signals (in-phase or I) and imaginary signals (quadrature-phase or Q). However, the data need not be quadrature modulated, and despreading on demand principles may be applied to any type of modulation scheme. One or more data frames of the composite signal received from multiple UEs for all antennas for all cells are stored in an data frame memory 62.

The important feature of the memory 62 is the ability to read out data to the despreaders 68 at a much faster rate than data is written into the memory. Any memory which permits this ability may be used. Otherwise, if despreaders were fed with I/Q data at the rate at which that I/Q data is stored in the memory 62, i.e., at the air interface timing-rate, a time period corresponding to a whole new (sub) frame would elapse before the last chip in the (sub) frame would be despread. This delay is not desirable, and indeed, is not acceptable for some applications. Accordingly, the composite signal I/Q data is read out from the addressable memory 62 at a read out rate considerably faster than the read-in rate corresponding to the air interface timing-rate, and the despreaders also despread at a speed much higher than the air interface timing-rate. One example way the high read-out rate can be achieved is by using a read-out clock with a higher frequency than the read-in clock. Another possibility which also can be combined with the higher frequency read-out clock, if desired, is to utilize a wider memory read-out port than the memory read-in port, where memory port width refers to the number of bits read/written from/to the memory in a single clock cycle.

In a non-limiting example, the data frame memory 62 may be a circular buffer memory. Circular buffers are typically used to hold data written by one process and read by another. Separate read and write pointers are used that are not allowed to cross each other so that unread data cannot be overwritten by new data. Consequently, the circular buffer appears to be organized in a circle, with data wrapping around it.

Typically, the data frame buffer memory 62 may store between one and two radio frames of composite UE data per receiver antenna, but just one frame or more than two frames could be stored per receiver antenna. However, to simplify the description, only the processing of one receiver antenna is shown and described. But if two or more receiver antennas are used, for example, composite signal storage would be needed for each antenna signal.

In practice, the composite signal I/Q data must be stored in the buffer memory 62 for the period of time equal to or longer than a maximum delay time: $T\_tot = T\_frame + T\_alg + T\_wait + T\_desp$. The delay component $T\_frame$ is the main contribution to the delay because the last chips of the current frame are received at the base station one frame/subframe after the first chip of that frame was received. The delay component $T\_alg$ is a delay due to receiver algorithm design, e.g., the channel estimation filter depends on some symbols from the subsequent frame. The delay component $T\_wait$ delay is present if the processing resources are occupied with despreading data corresponding to one or several other users/UEs. The delay component $T\_desp$ is the time it takes for the processing resources to read out the I/Q data from the buffer and despread the frame. $T\_desp$ and $T\_wait$ are not independent of each other. The more users processed by the same unit, the longer $T\_wait$ will be unless $T\_desp$ is reduced. Despreading-on-demand reduces delay component $T\_desp$ so that typically, $T\_tot$ is more than one frame period but less than two frame periods. However, if the data frame memory allows buffering of more than two frames, then despreading-on-demand can be used to despread more than one frame. This situation could be useful for multi-frame transmission time interval (TTI) radio access bearers, such as 20, 40, or 80 msec TTIs, since the same transport format has been signaled in all these frames.

Because the received composite signal is composed of several unsynchronized, additively combined UE signals, a supervisory processor 74 acquires and maintains knowledge of each UE's coarse timing relative to an absolute base station time generated by a timing unit 76. In addition to the coarse absolute timing, the supervisory processor 74 keeps track of the timing of each UE's Rake fingers, corresponding to the propagation delay $\tau$ in each Rake finger, relative to the coarse absolute timing. By combining the coarse and relative timings, an absolute timing for each Rake finger can be obtained.

Each UE's timing can be viewed as one of many state variables for a UE. All different state variables may be handled by the supervisory processor 74 which evaluates for each time increment whether it is time to initiate a despreading job for a particular user. The timing unit 76 also detects, in absolute base station time, when a certain address is written in the data frame memory 62. Thus, there is a mapping between absolute time of a memory write operation and the memory address at which the data is written at that time. Because the supervisory processor 74 knows each Rake fingers' frame and slot timings in base station absolute time, the supervisory processor 74 can control the timing unit 76 to obtain the memory address of the subframe/frame of each UE's rake fingers.

At the same time that the frame of composite UE data is being buffered in the data frame memory 62, the control channel baseband information associated with the UE data (referred to as the control data) is extracted from the received frame of the composite signal in the control channel despreader 64. (Again, despreading-on-demand could also be used by the control channel despreader 64). One UE's control data is obtained by descrambling the I/Q data in the composite signal (assume for the following description that the composite signal contains complex I/Q data) using a user-specific scrambling code and by despreading the descrambled I/Q data using a channelization code and spreading factor corresponding to the control channel. The channelization code and spreading factor for the control channel do not change once they have been assigned/allocated. The control channel despreader 64 provides the despread control channel information to a control channel demodulator 65 and to a channel estimator 66. The channel estimator 66 estimates the current radio channel transfer function and provides the channel estimate to the control channel demodulator 65 which uses the channel estimates to compensate the despread control data for distortion caused by transmitting over the channel. When the entire I/Q data frame is received, despread, and demodulated, a transport format (TF) indicator extractor and decoder 67 determines from the demodulated control channel information for the entire UE-specific frame the actual spreading factor $SF_{actual}$.

Early in the next frame time period, when the supervisory processor has been notified that $SF_{actual}$ is available, the processing of the DPDCH is initiated by executing the despreading blocks 68a, 68b, ..., 68n. In one non-limiting example embodiment, despreading the data stored in the data frame memory 62 for each Rake finger corresponds to a despreading job, and normally there are multiple Rake fingers for each UE's signal. Using the address corresponding to the absolute timing for the first Rake finger being processed, the supervisory processor 74 addresses and reads out the frame of received composite data (e.g., complex I/Q data) that is corresponding to that particular Rake finger from the data frame buffer memory 62. The addressed composite data are retrieved and processed by a despreader. For the next rake finger belonging to the same UE, the process is repeated 68b but with another absolute timing of the rake finger which the supervisory processor converts to a memory address before initiating the job. Memory readout addresses for the second Rake finger will be slightly offset compared to the memory readout addresses for the first Rake finger. This offset corresponds to the difference in propagation delay for the two Rake finger signal propagation paths. These address offsets for the Rake fingers are illustrated by the overlapping but slightly shifted arrows coming out of the data frame memory 62 in FIG. 9. The same process is then repeated until the last Rake finger has been despread 68n. As explained above, the readout rate from the buffer memory 62 is considerably faster than the rate at which the frame was stored in the memory because the data storage rate is driven by the relatively slow rate at which data is delivered over the air interface, while the readout rate (e.g., a rate equivalent or similar to the despreading rate) must be much faster to minimize additional latency for the UE data.

Accordingly, the data channel despreaders 68a, 68b, . . . , 68n first descramble the composite signal I/Q data using a UE-specific descrambling code, and then despread the descrambled UE data using the channelization code(s) and the actual spreading factor $SF_{actual}(s)$ extracted from the TFCI decoded by the transport format indicator extractor and decoder 67. Although channelization codes may vary for E-DCH with SF4 and SF2, for regular DCH, the DPDCH channelization code is typically the same. Moreover, the TFCI points out whether multi-code was used during this frame/subframe.

The despread data is further processed in a RAKE demodulator 70 which performs channel compensation using the channel estimates provided from the channel estimator 66 and maximum ratio combining (MRC) of the despread RAKE finger data to generate one frame (or one subframe) of "soft" symbol values which are decoded by the decoder 72 to generate UE data values. Other operations may be performed on the despread or decoded data such as de-interleaving, transport channel de-segmentation, etc.

The despreading-on-demand approach described above only despreads the data actually received, and the data frame memory need not be sized for worst case but unlikely situations. The data frame memory for storing one or more data frames eliminates the need for two stages of despreading required in the pre-despreading approach described in the background because the data buffering allows the calculation of the transport format and the spreading factor before data frame processing including despreading is performed on the composite signal. Fast read out of data from the data frame memory and fast despreading overcome latency issues. Indeed, despreading-on-demand is particularly beneficial when the same receiver equipment processes a large number of UEs since increasing the number of UEs does not increase the data frame buffer size. The reason for this is that in CDMA all UEs transmit simultaneously on the same carrier frequency and are differentiated by their scrambling codes (and in some cases channelization codes). Thus, the same composite signal received at an antenna, regardless of the number of UEs, provides sufficient data for despreading, demodulating, and decoding the signals from all UEs that are simultaneously transmitting on that frequency and being received in that sector on that antenna.

Figure 10:
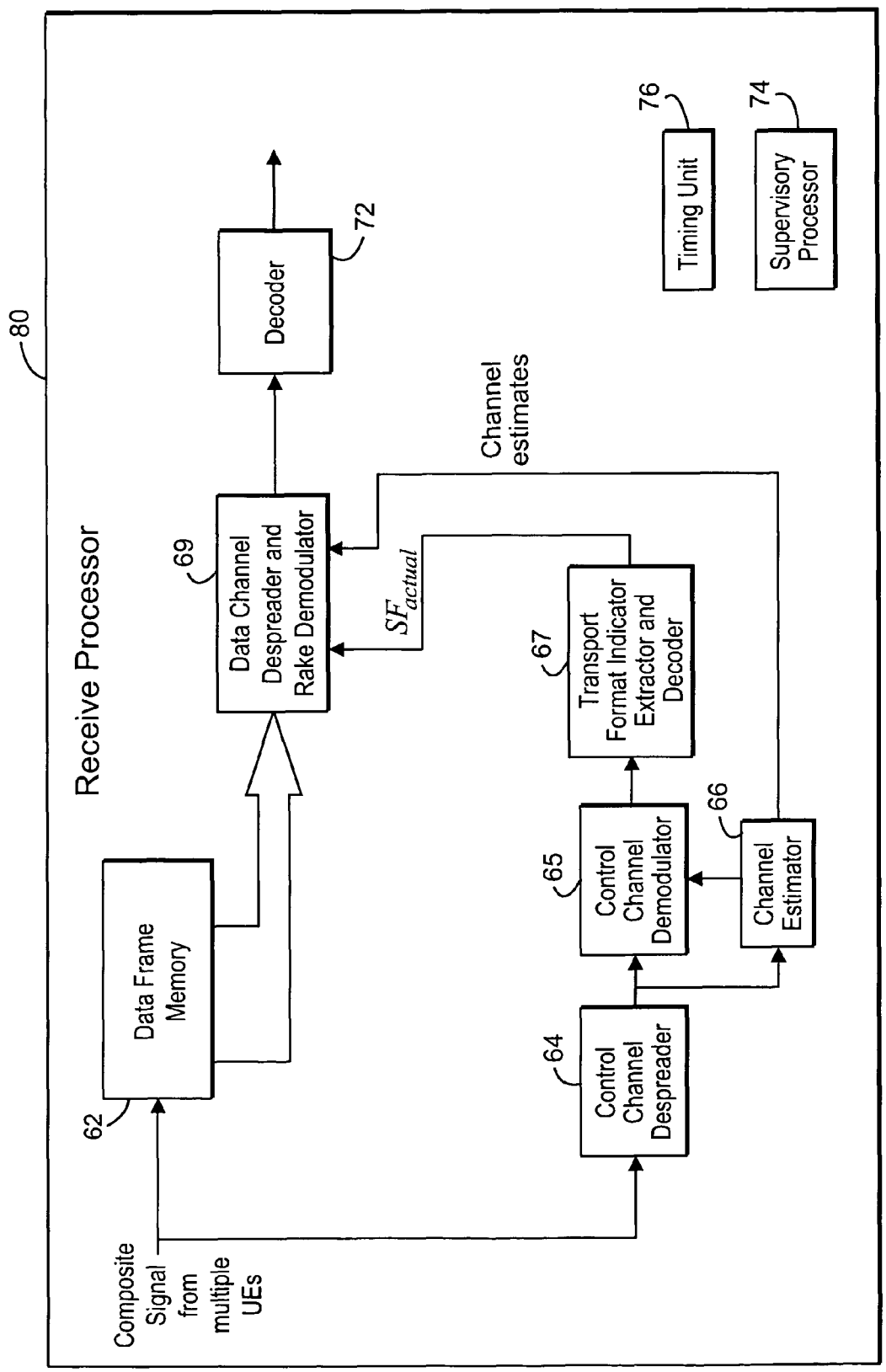
FIG. 10 is a function block diagram of another non-limiting example receive processor using despreading-on-demand.

FIG. 10 is a function block diagram of another non-limiting example receive processor embodiment 80 using despreading-on-demand. Here, all Rake finger despreading, channel compensation, and maximum ratio combining (MRC) for a frame of composite data from an antenna may be performed altogether as a single job per frame per UE in a single data channel despreader and RAKE demodulator 69.

In this example embodiment, the same amount of composite signal needs to be stored in the data buffer 62 as was done in the previous example despreading on demand embodiment. However, the data channel despreader and Rake demodulator 69 only reads a fraction of a subframe/frame of the composite signal corresponding to the first Rake finger, and then descrambles, despreads, and channel compensates this data with channel estimates from channel estimator 66 corresponding to the particular Rake finger and the particular fraction of a subframe/frame. These channel-compensated symbols are temporarily stored while the same operations are repeated on the same fraction of a subframe/frame for the next Rake finger. The temporarily stored symbols for the subframe/frame fraction are additively combined with symbols from the new subframe/frame fraction which replaces the old temporarily stored symbols. These operations are repeated for the remaining rake fingers. When all rake fingers have been combined for this subframe/frame fraction, the combined result can be output to the decoder 72, after which, the process is repeated for the remaining fractions of the frame/subframe. The benefit of using despreading-on-demand in this way is that a minimum of buffering is needed for temporary storage of channel compensated Rake finger symbols, and that this can be accomplished without increasing the time for despreading, T_desp.

Figure 11:
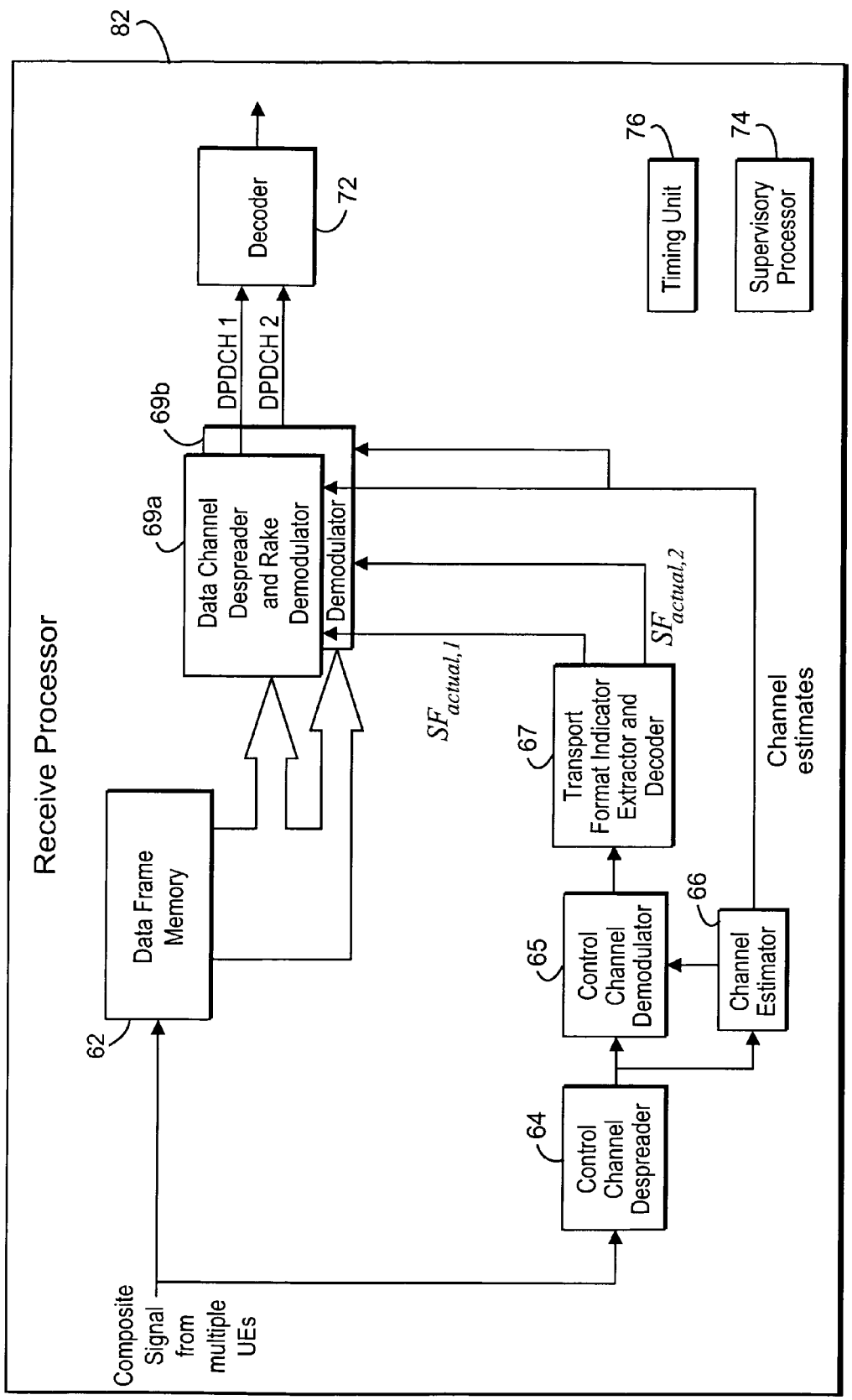
FIG. 11 is a function block diagram of another non-limiting example receive processor using despreading-on-demand for a multi-code user.

FIG. 11 is a function block diagram of another non-limiting example receive processor embodiment 82 using despreading-on-demand for a multi-code application. Recall that in multi-code applications, a UE is assigned more than one spreading code in order to provide that UE greater bandwidth. In this example, two codes have been allocated to a UE, but more than two codes may be assigned. Each code can be viewed as a dedicated physical data channel such as a DPDCH. To simplify the description, the arrangement is similar to that in FIG. 10, except that two data channel despreader and demodulators 69a and 69b are provided to despread and demodulate the I/Q data for each of the two spreading codes assigned to the UE. Each data channel despreader and demodulator 69a and 69b will process the data in the same way as the data channel and demodulator 69 in FIG. 10 previously was described to do, but each utilizes different channelization codes, and in general, different spreading factors $SF_{actual,1}$ and $SF_{actual,2}$ for the despreading process. Hence, in this embodiment, the same composite data is read twice from the data frame memory 62, but is then despread with different channelization codes for data channels DPDCH1 and DPDCH2, thus yielding different UE data soft values for decoding. A benefit with this embodiment is that the despreading jobs need only be performed if the transport format decoded from the user's control channel indicates that two (or more) data channels (e.g., DPDCHs) were transmitted during this subframe/frame.

Figure 12:
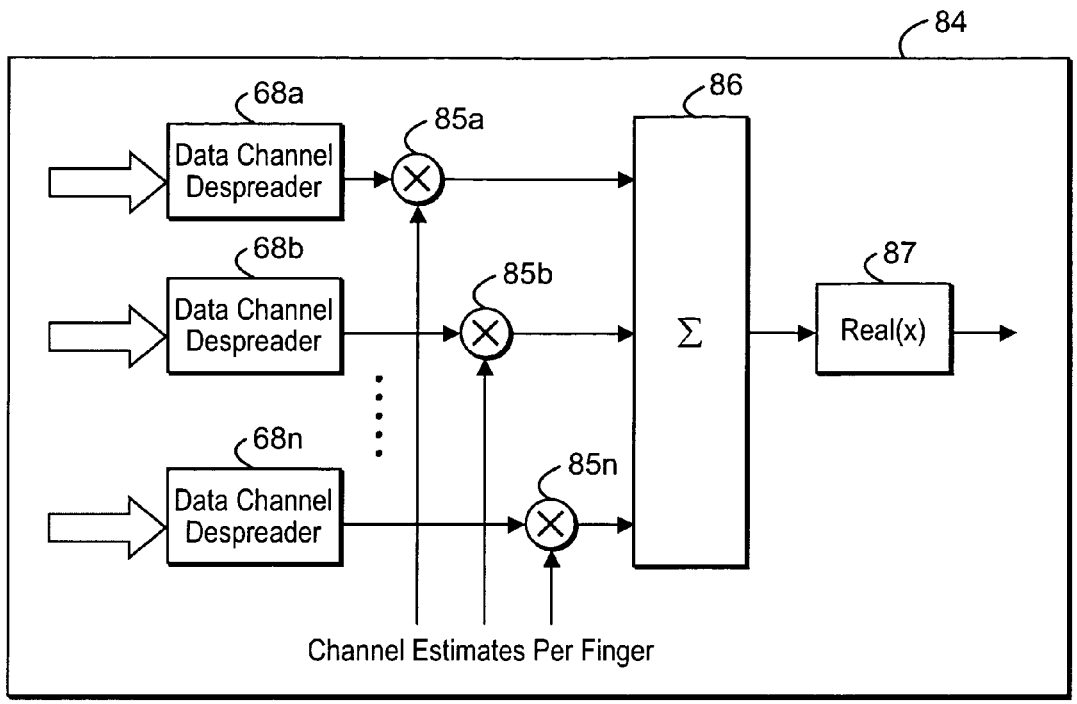
FIG. 12 is a function block diagram illustrating RAKE finger despreading and combining where only soft values from the real part are used.

FIG. 12 is a function block diagram illustrating RAKE finger despreading and combining where only real soft values are used. Recall above that the composite UE signal may be complex with real and imaginary quadrature channels. However, the data need not be complex and could be just real data or imaginary data. In this example, n RAKE fingers provide data to n data channel despreaders 68a, 68b, . . . , 68n. Each despreader output is multiplied in a corresponding multiplier

85a, 85b, . . . , 85n by the channel estimates provided by the channel estimator 66. That multiplication compensates each of the despread outputs for distortion caused by the radio channel. The summer 86 then combines (e.g., MRC) the channel-compensated, despread signals to generate a complex signal having both real and imaginary components. A real component extractor 87 extracts just the real components of the complex signal (the imaginary components are discarded) and forwards them as soft information to be decoded in decoder 72. This is one example way in which the data channel despreader and demodulator 69 in FIG. 10 and data channel despreader and demodulators 69a and 69b in FIG. 11 may be implemented.

Figure 13:
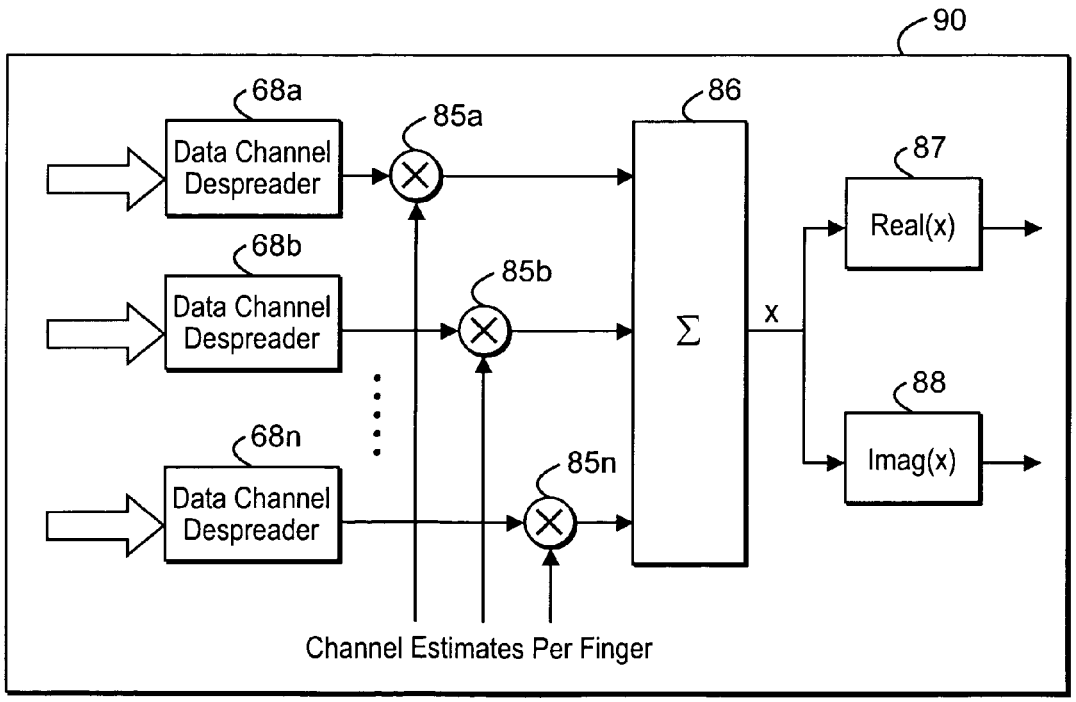
FIG. 13 is a function block diagram of another non-limiting example receive processor using despreading-on-demand for a multi-code user where two user channels are I/Q multiplexed to the same channelization code.

FIG. 13 is a function block diagram illustrating Rake finger despreading and combining where soft values from both the real and imaginary parts are used. In this example, n RAKE fingers provided data to n data channel despreaders 68a, 68b, . . . , 68n. Each despreader output is multiplied in a corresponding multiplier 85a, 85b, . . . , 85n by the channel estimates provided by the channel estimator 66. That multiplication compensates each of the despread outputs for distortion caused by the radio channel. The summer 86 then combines (e.g., MRC) the channel compensated, despread signals to generate a complex signal having both real and imaginary components. A real component extractor 87 extracts the real components of the complex signal, and an imaginary component extractor 88 extracts the imaginary components of the complex signal. Those real and imaginary components are forwarded as soft information to be decoded in decoder 72.

Figure 14:
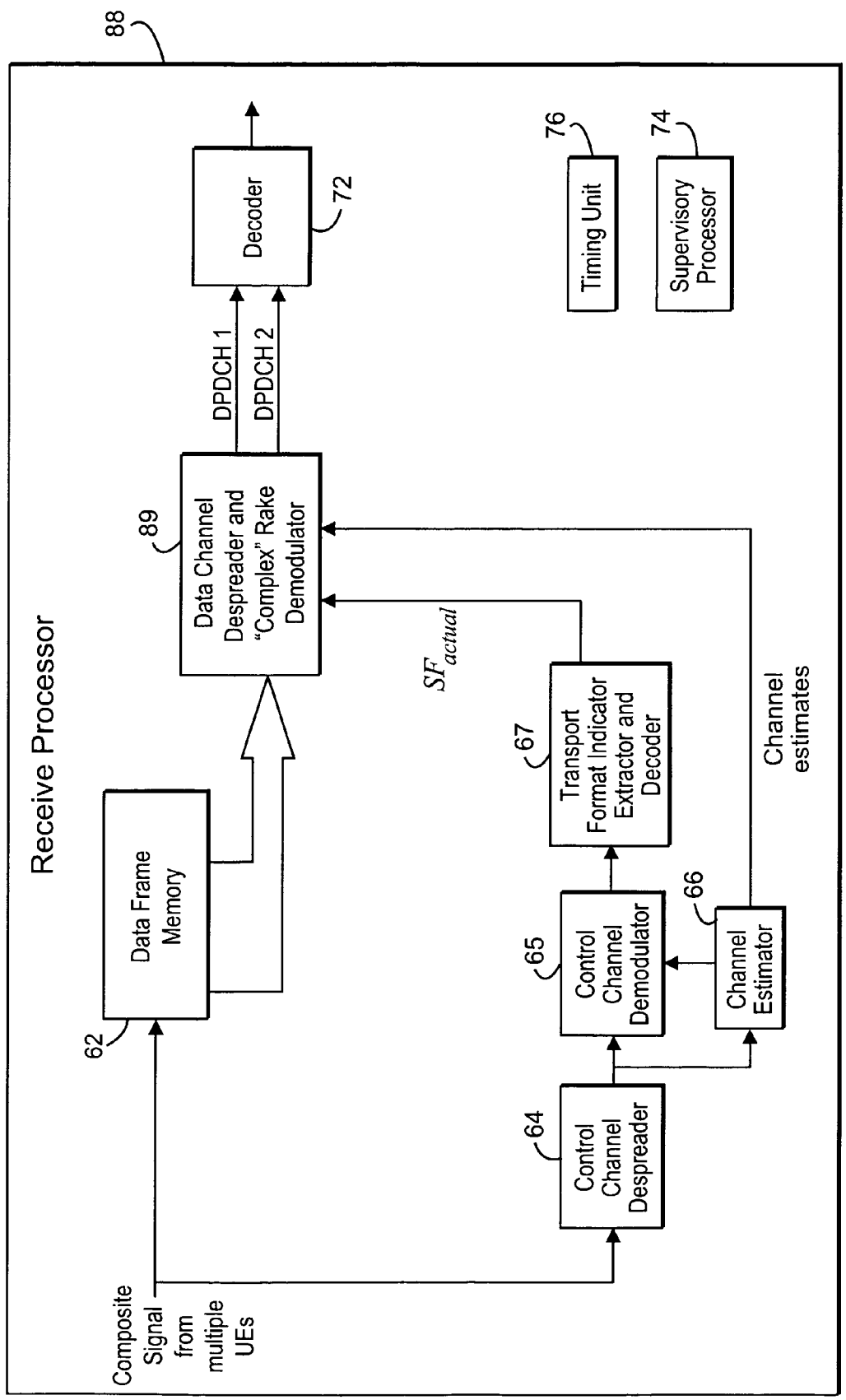
FIG. 14 is a function block diagram illustrating RAKE finger despreading and combining where soft values from both the real and imaginary parts are used.

FIG. 14 is a function block diagram of another non-limiting example receive processor 88 using despreading-on-demand for a multi-channel per UE application. But in this example, the multi-channel feature is supported using a data channel despreader and "complex" RAKE demodulator 89. Again, the non-limiting example of two dedicated data channels allocated to one UE is used, but in this multi-channel scenario, only one spreading code is used. Rather than use two spreading codes to achieve the greater bandwidth, I/Q multiplexing is used to modulate the user data as complex quadrature data, where two dedicated data channels are despread using the same one actual spreading factor and spreading code. In the UE transmitter, one spread DPDCH subframe/frame is mapped to the real part and another spread DPDCH subframe/frame is mapped to the imaginary part of the complex base band signal. The UE then scrambles the I/Q multiplexed subframe/frame containing data from two different channels with the UE's scrambling code before RF transmission.

In the data channel despreader and "complex" RAKE demodulator block 89 in the base station receiver, similar processing may be performed as in the data channel despreader and Rake demodulator 90 shown in FIG. 13. For the I/Q multiplexed data channels, the real part of the signal 87 contains soft values corresponding to the first data channel, DPDCH1, and the imaginary part of the signal 88 then contains soft values corresponding to the second data channel, DPDCH2. Both sets of soft values are provided to the decoder 72 for decoding. A benefit with this embodiment is that only a single set of rake finger despread jobs is required to produce two DPDCHs in this special multi-code case.

In systems that allow higher order modulation, i.e., a transmitter can map the physical data bits using a symbol modulation scheme other than I/Q-multiplexed BPSK, such as QPSK, 8-PSK, or M-QAM (M=16, 64, etc.), before spreading and scrambling the data. If the symbol modulation used is communicated on a physical control channel or is in some other way known by the receiver, the same receiver as 88 in FIG. 14 can be used to demodulate and decode such a signal because the output of the data channel despreader and "complex" Rake demodulator 89 can be interpreted as complex "soft" information. The decoder can then as a first step convert these complex symbols into "soft" values of the bits mapped to the higher order modulation symbols.

Figure 15:
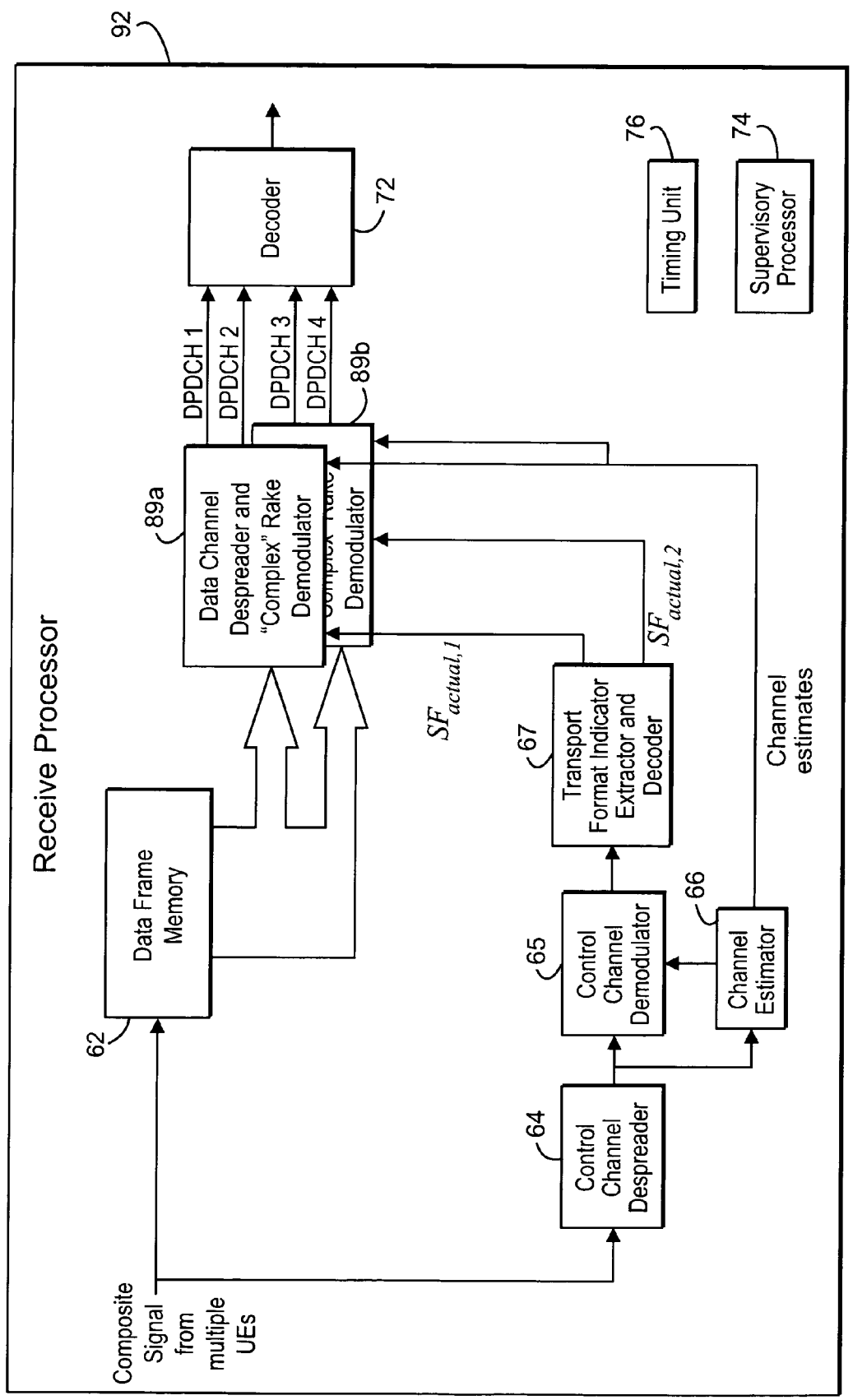
FIG. 15 is a function block diagram of another non-limiting example receive processor using despreading-on-demand for a multi-code user where two code-multiplexed channelization codes each carry two user channels that are I/Q multiplexed.

FIG. 15 is a function block diagram of another non-limiting example receive processor embodiment 92 using despreading-on-demand for a multi-code application. In this multi-code example, two different spreading codes/spreading factors are used along with I/Q multiplexing of data traffic channels to effectively provide a UE with four dedicated data channels, e.g., DPDCHs 1-4. Data channel despreader and "complex" RAKE demodulator blocks 89a and 89b receive corresponding spreading factors $SF_{actual.1}$ and $SF_{actual.2}$ extracted from the control information. Moreover, I/Q multiplexing provides the two additional data channels corresponding to the real and imaginary components of the received complex signal.

In despreading-on-demand, the large capacity pre-despreading FIFO data buffers required for pre-despreading using an estimated spreading factor are eliminated. Instead, a data frame memory having a fixed size of $K_{fr} \times N_{ant}$ may be used, where $K_{fr}$ is the amount of frame data and $N_{ant}$ is the number of antennas providing UE received signals. In order to despread the data with higher output signal-to-noise ratio, (usually a desirable objective), the sampling phase of the data to be despread must be one quarter chip accurate. This implies that the despreaders must process four times oversampled (4×OS) data. However, a four times oversampling factor is costly because a larger I&Q memory is needed to store the $K_{fr}$ frame data. From a performance perspective, two times oversampling (2×OS) could be used because it sufficiently represents the I/Q data signal without the loss of information. As a result, the I/Q data can be stored in the addressable buffer memory at 2×OS, which means less data needs to be stored per frame, and thus, a smaller and less costly buffer memory can be used. A 4×OS signal can be reconstructed from the 2×OS signal just before despreading.

Figure 16:
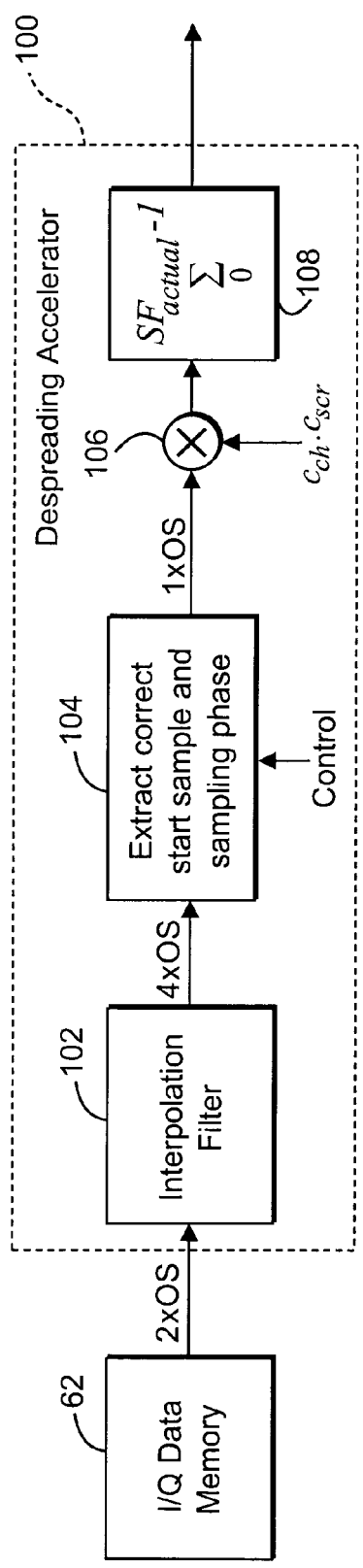
FIG. 16 is a function block diagram of a non-limiting example despreading accelerator.

FIG. 16 illustrates one non-limiting example way of implementing the reduced sampling rate. The composite UE I/Q data is stored in the addressable memory 62 at two times oversampling (2×OS). Two times oversampling (2×OS) is used to save memory. The two times oversampled (2×OS) data read out from the memory 62 is provided to a despreading accelerator 100. The despreading accelerator 100 includes an interpolation filter 102, which may be as a non-limiting example, a linear interpolation filter matched to the WCDMA raised cosine waveform in the sense that its output signal has a spectrum matching the raised cosine form. The filter 102 reconstructs a four times oversampling (4×OS) signal by interpolating between sample points from the two times oversampled (2×OS) signal. Block 104 down-samples the 4×OS signal to the chip rate, i.e., 1×OS, and extracts a correct start sample and sampling phase. The start sample and sampling phase are job-unique despreading job parameters and must be supplied by the supervisory processor 74 at the initiation of every despreading job. A correct start sample must be extracted from the filtered 4×OS sample stream for each despreading job, since the accelerator 100 has been fed with a few extra start samples intended to fully excite the interpolation filter 102. The one times oversampled (1×OS) signal is descrambled and despread in multiplier 106 using the product of the scrambling code and the channelization code.

Figure 17:
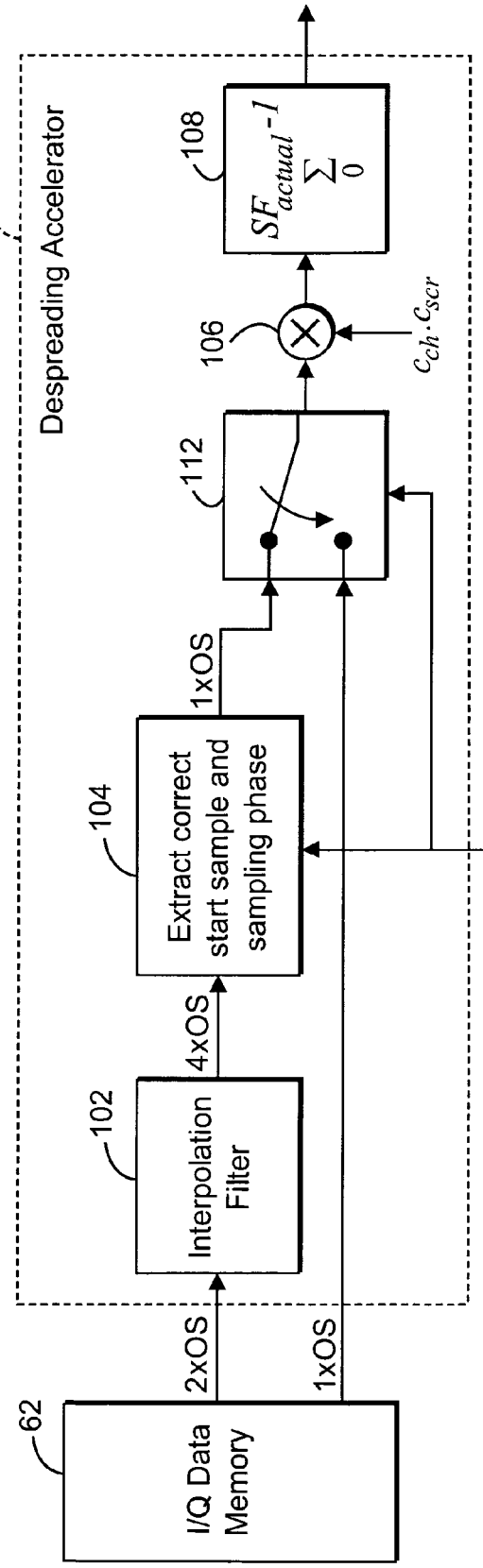
FIG. 17 is a function block diagram of a non-limiting example of another type of despreading accelerator.

The accelerator 100 can also be modified in order to improve the average despreading speed. The sampling phase of a rake finger can be considered a random variable which is evenly distributed among four possible phases if 4×OS is used. Thus, on average, only 50% of the Rake fingers require a sampling phase that is not already available in the 2×OS data frame memory. FIG. 17 illustrates a non-limiting example of a modified accelerator 110 that reads out 1×OS data from the memory 62 and, using a controlled bypass 112, bypasses the interpolation filter 102 and the extractor/downsampling block 104 when despreading a rake finger which has a sampling phase already available in the 2×OS data frame buffer 62. The supervisory processor 74 reads out 2×OS or 1×OS data from the memory 62 by initiating the read-out with the set of memory addresses corresponding to the desired 1×OS or 2×OS data flows.

Figure 1:
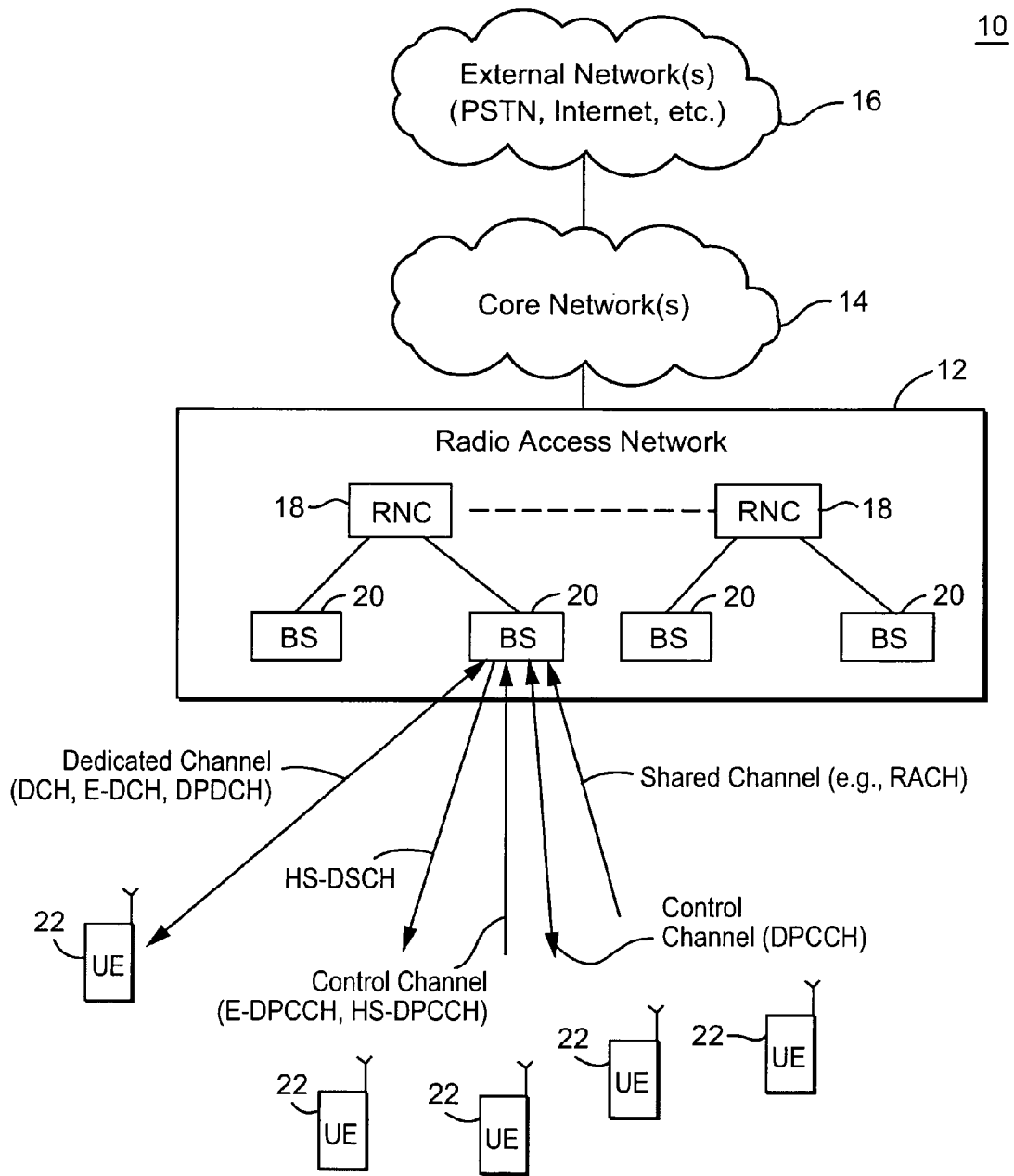
FIG. 1 is a high level drawing of a mobile communications network.
Figure 2:
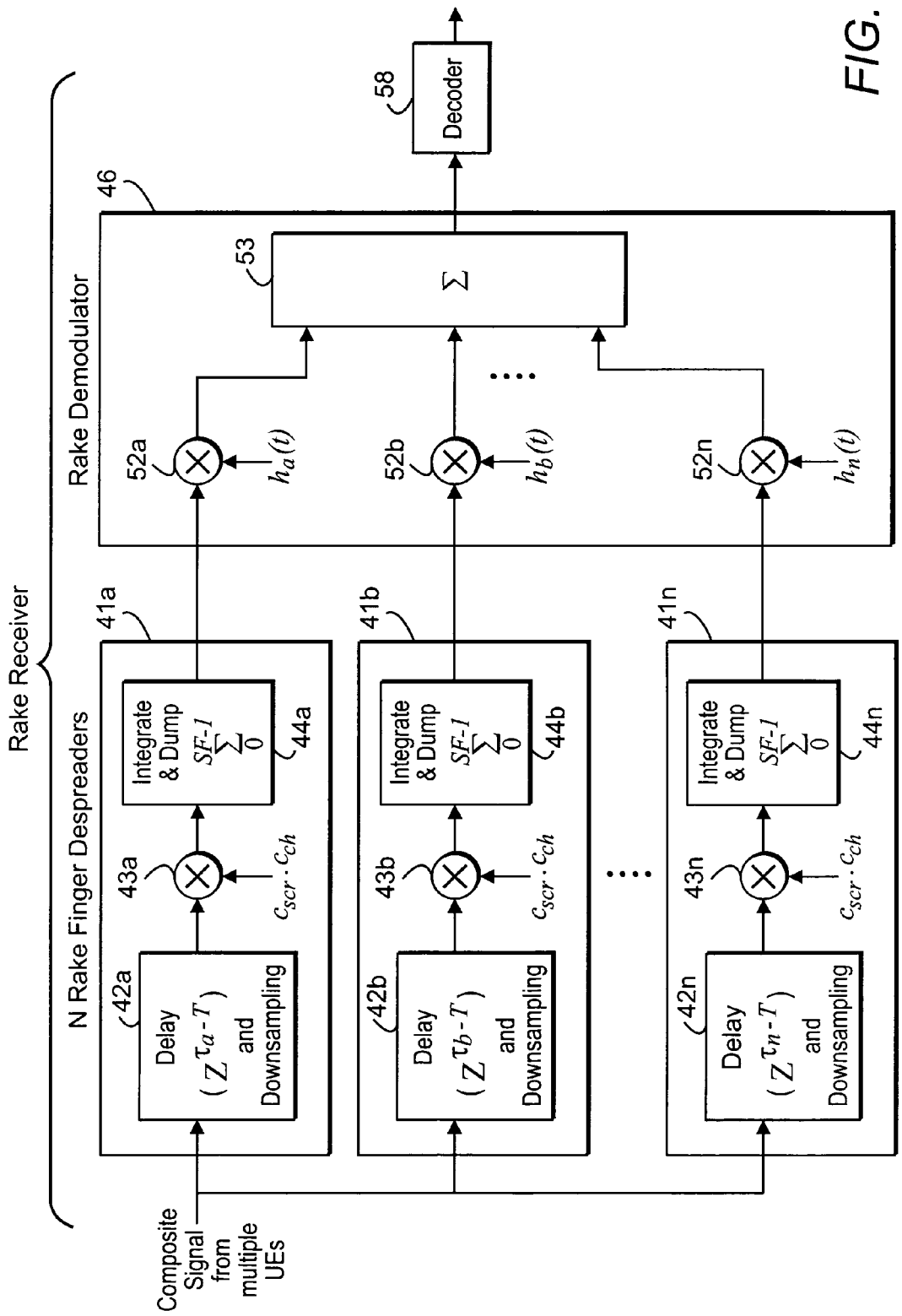
FIG. 2 is a simplified function block diagram of a Rake receiver.
Figure 3:
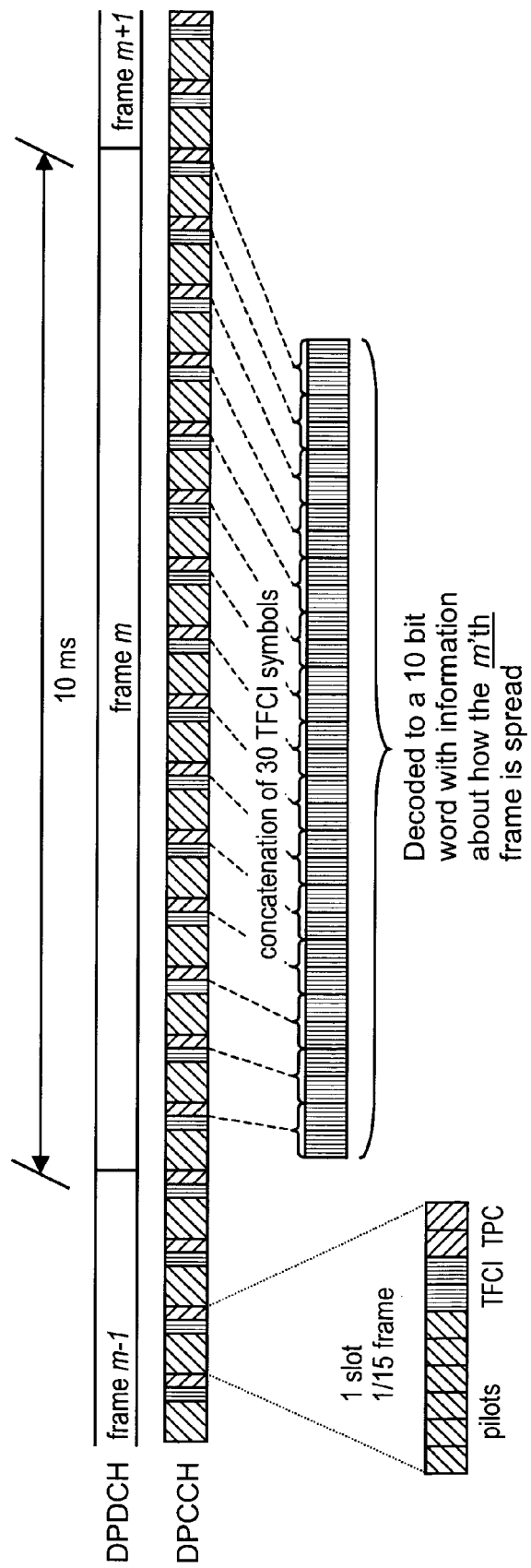
FIG. 3 is a diagram that illustrates the formatting of the DPDCH frames and DPCCH slots and their relationship to each other.
Figure 4:
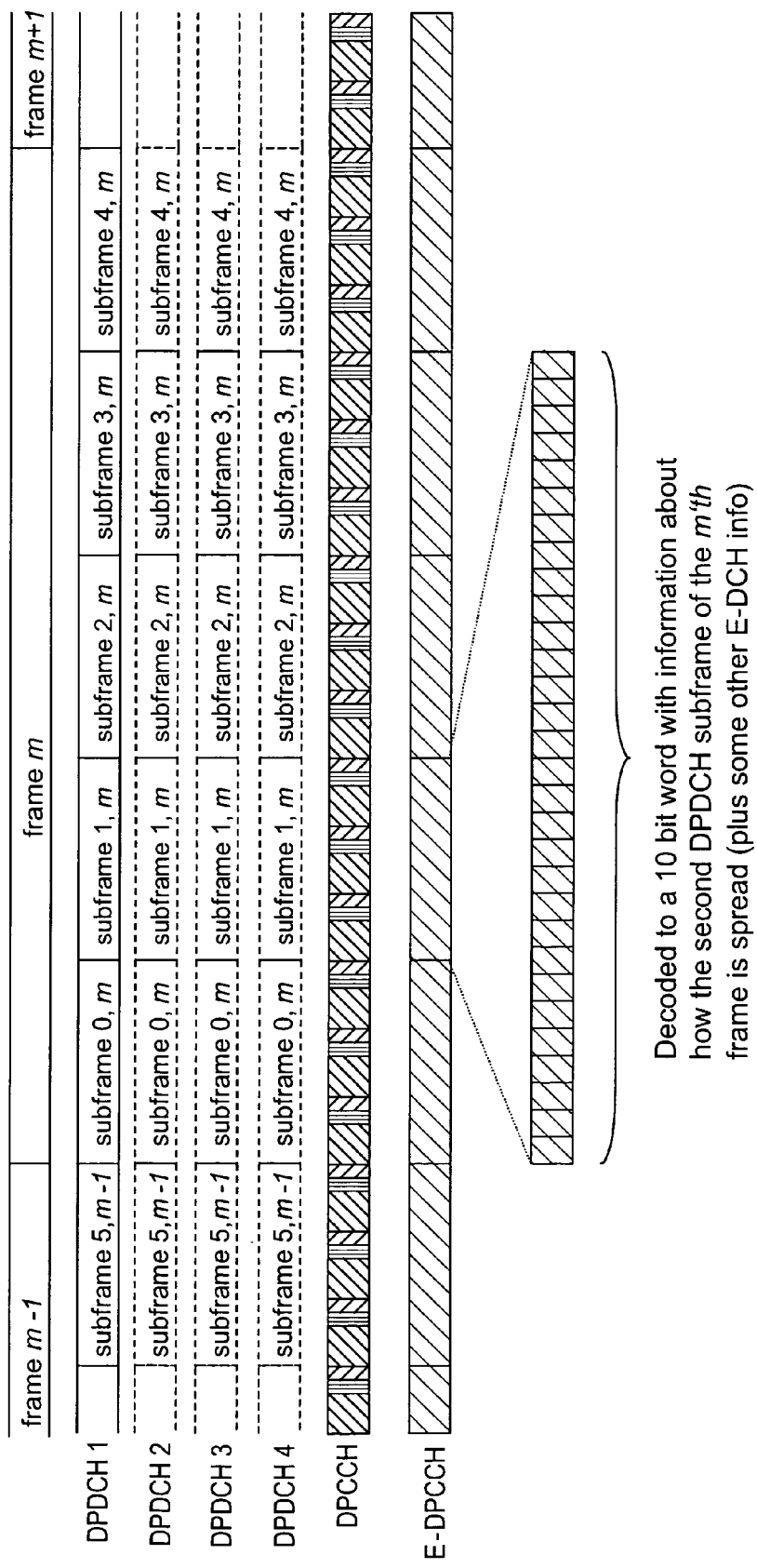
FIG. 4 is a diagram that illustrates the formatting of four DPDCH channel frames, DPCCH slots, and E-DPCCH slots and their relationship to each other.
Figure 5:
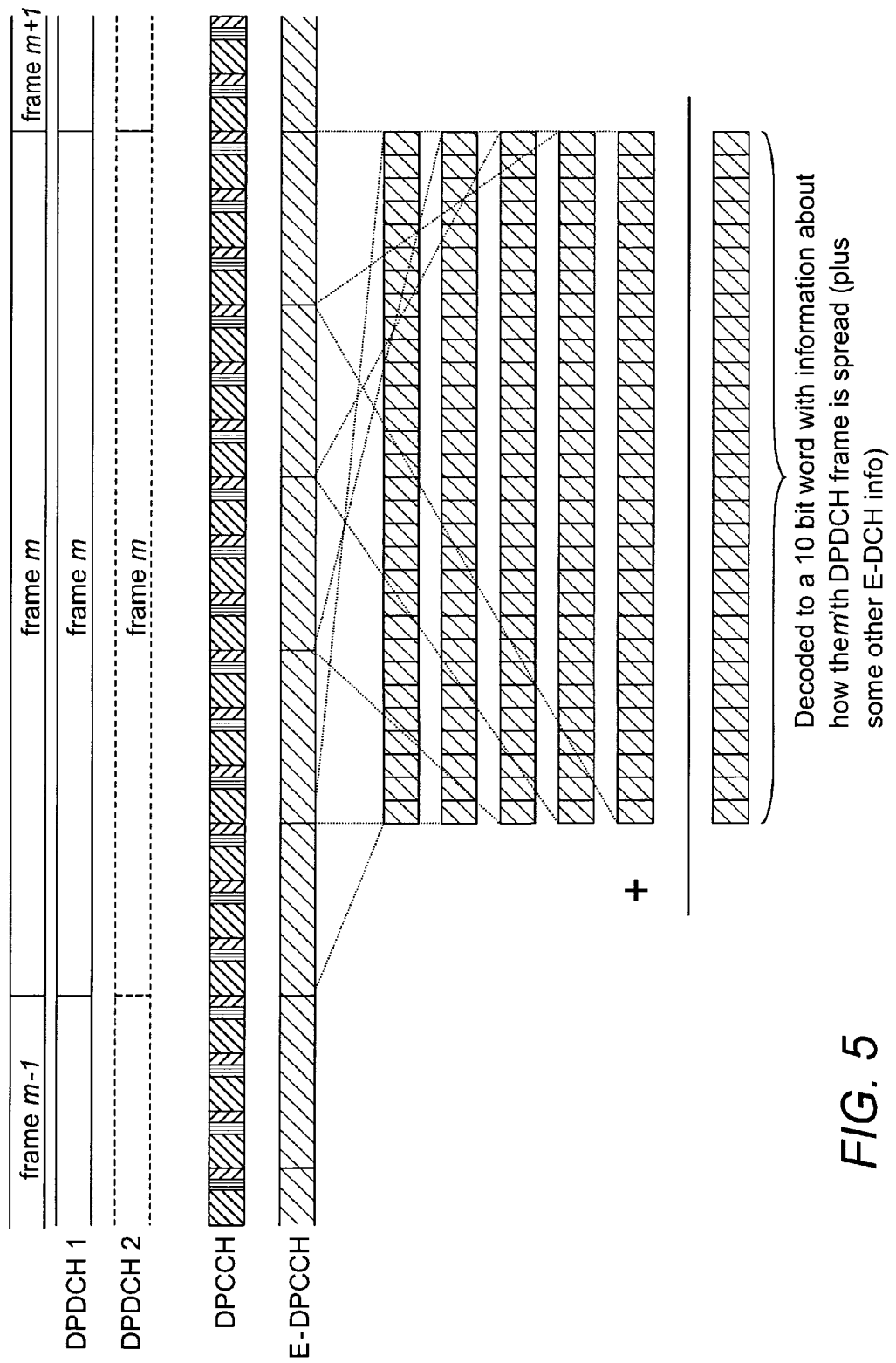
FIG. 5 is a diagram that illustrates the formatting of two DPDCH channel frames, DPCCH slots, and E-DPCCH slots and their relationship to each other.
Figure 6:
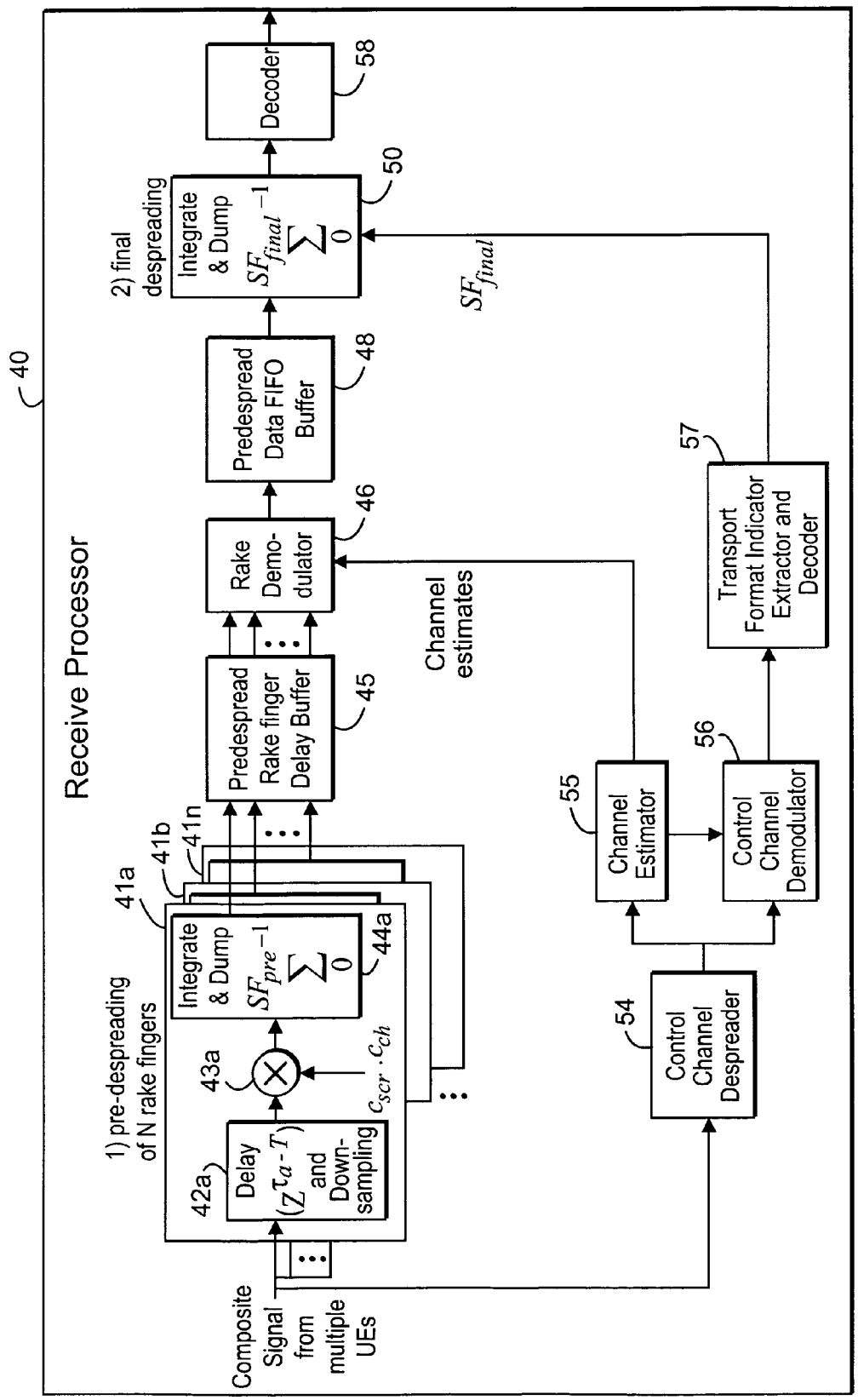
FIG. 6 is a function block diagram of a receive processor using pre-despreading.

The advantages of a despreading-on-demand (DoD) technique become clear when compared to a multi-user pre-despreading approach. Although the memory cost for the despreading-on-demand (DoD) technique is fixed and independent of the number of users, the memory cost of the pre-despreading approach illustrated in FIG. 6 increases linearly with the number of users. The reason for this is that with DoD, the (sub) frame buffering is done at a stage where the data is still a generic, composite signal including all UE's contributions, while for predespreading, the (sub) frame buffering is done after the UE-unique predespreading. This cost comparison is illustrated in Table 2 below which shows buffer consumption in kBytes based on example numbers for certain receiver parameters. For the per-despread approach the total buffering size needed is shown including both buffer 45 and 48 in FIG. 6. For the predespread rake finger delay buffer 45, 16 rake fingers, 2 bytes per complex predespread rake finger symbol has been assumed. Moreover, a length of 2.5 slots, a slot being ⅕ of a frame, has been assumed for buffer 45. For the predespread data FIFO buffer 48, two consecutive frames of predespread symbols, and 2 bytes per predespread symbol has been assumed. For the despreading-on-demand approach, 12 antennas, 2 bytes per I/Q sample, 2 samples per chip (2×OS) has been assumed for the data frame memory 62. As mentioned earlier, for DoD, the total buffering requirement is independent of the number of UEs since the composite signal data buffer is shared among all UEs regardless of the number of UEs.

antennas were served by the receiver, the data frame memory size would decrease proportionally while the pre-despread buffers 45 and 48 remain the same size. Moreover, the problem that the pre-despreading approach experiences due to the different OVSF code base for the SF2 and the SF4 DPDCHs is completely eliminated for the despreading-on-demand (DoD) technique because the despreaders are only configured according to the actually transmitted transport format (TF).

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" or "step for" are used.

The invention claimed is:

1. A method for processing a composite spread spectrum signal received over a communications interface from multiple transmitters, comprising:

storing composite spread data received from the multiple transmitters in a data memory at a first rate corresponding to a rate at which the composite data is received over the communications interface, the method further comprising for each transmitted signal;

determining during a first time period an actual spreading factor associated with a first frame of spread data for the transmitted signal which is included in a frame of composite spread data stored in the data memory; and during a second time period following the first time period, reading out the first frame of the composite spread data from the data memory corresponding to the first frame of spread data for the transmitted signal at a second rate substantially greater than the first rate and despreading the readout data using the determined spreading factor.

2. The method in claim 1, further comprising:

during the first time period, despreading control information associated with the stored first frame of spread data, wherein the actual spreading factor associated with the first frame of spread data is determined from the despread control information.

TABLE 2

Buffer size comparison between PreD and DoD techniques.

| # users | Pre-despreading buffer [kBytes] | | | | Despreading-on-demand [kBytes] | |
|---|---|---|---|---|---|---|
| | SF64 | SF16 | SF4 | 2× SF2 | $K_{fr}$ = 1.4 frames | $K_{fr}$ = 1.7 frames |
| 1 | 5 | 22 | 88 | 450 | 2 520 | 3 060 |
| 2 | 11 | 44 | 175 | 900 | 2 520 | 3 060 |
| 4 | 22 | 88 | 350 | 1 800 | 2 520 | 3 060 |
| 8 | 44 | 175 | 700 | 3 600 | 2 520 | 3 060 |
| 16 | 88 | 350 | 1 400 | 7 200 | 2 520 | 3 060 |
| 32 | 175 | 700 | 2 800 | 14 400 | 2 520 | 3 060 |
| 64 | 350 | 1 400 | 5 600 | 28 800 | 2 520 | 3 060 |
| 128 | 700 | 2 800 | 11 200 | 57 600 | 2 520 | 3 060 |
| 256 | 1 400 | 5 600 | 22 400 | 115 200 | 2 520 | 3 060 |

Thus, the numbers in Table 2 reveal that the lower the spreading factor (SF) to be supported for each UE and the larger the number of UEs, the larger the gain with the despreading-on-demand technique. In addition, if, for example, only two 3. The method in claim 1, wherein the multiple transmitters are mobile radio terminals, the method is implemented in a radio base station, and the communications interface is an air or wireless interface.

4. The method in claim 1, wherein the method is implemented in a mobile radio terminal, and the communications interface is an air or wireless interface.

5. The method in claim 1, wherein the data memory is an addressable memory.

6. The method in claim 5, further comprising:
determining a time when the first frame of spread data received from the transmitter is stored in the addressable memory at an addressable location, and
using the determined time as an address to read out the first frame of composite spread data from the addressable memory.

7. The method in claim 2, further comprising:
extracting the spreading factor from a transport format indicator included in the control information.

8. The method in claim 1, further comprising:
despreading the read out frame of composite spread data using multiple Rake despreading fingers to generate multiple despread outputs associated with one of the transmitters;
combining the multiple despread outputs into a single despread output corresponding to the one transmitter; and
decoding the single despread output to generate data transmit by the one transmitter.

9. The method in claim 1, further comprising the following steps:
(a) reading out and despreading a first fraction of the frame data corresponding to a first Rake finger using a single despreading and demodulating processor to generate a first Rake finger despread output;
(b) storing the first Rake finger despread output;
(c) reading out and despreading a first fraction of the frame of composite spread data corresponding to a second Rake finger using the single despreading and demodulating processor to generate a second Rake finger despread output;
(d) combining the first and second Rake finger despread first fraction outputs to generate a combined Rake finger despread first fraction output and storing the combined Rake finger despread first fraction output;
(e) reading out and despreading the first fraction of the frame of composite spread data corresponding to each remaining Rake finger using the single despreading and demodulating processor for each remaining Rake finger to generate a corresponding Rake finger despread first fraction output, and combining each corresponding Rake finger despread first fraction output with the stored combined Rake finger despread output to generate a current combined Rake finger despread first fraction output;
repeating (a)-(e) for remaining fractions of the frame of composite spread data; and
decoding the current combined Rake finger despread outputs for all the despread fractions.

10. The method in claim 1, wherein one of the transmitters is assigned two different channelization codes having a first spreading factor and a second spreading factor, the method further comprising:
during the first time period, determining the first and second spreading factors;
during the second time period following the first time period, reading out the frame of composite spread data from the data memory at the second rate and despreading the readout data using the determined first spreading factor to generate first despread data and despreading the readout data using the determined second spreading factor to generate second despread data; and
decoding the first and second despread data.

11. The method in claim 1, wherein one of the transmitters uses quadrature multiplexing to modulate data to be transmitted as a complex signal where first data corresponding to a first traffic channel is spread using a spreading code and the spread data is mapped to a real component of the complex signal and second data corresponding to a second traffic channel is spread using the same spreading code is mapped to an imaginary component of the complex signal, the method further comprising:
despreading the read out data to generate a despread complex signal;
extracting a real component of the despread complex signal and an imaginary component of the despread complex signal;
decoding the extracted real component as the first data and the extracted imaginary component as the second data.

12. The method in claim 1, wherein one of the transmitters is assigned first and second channelization codes having a first spreading factor and a second spreading factor, respectively, and wherein the one transmitter uses quadrature multiplexing to modulate data to be transmitted as a complex signal, where first data corresponding to a first traffic channel is spread using the first channelization code and the spread data is mapped to a real component of a first complex signal, second data corresponding to a second traffic channel is spread using the first channelization code is mapped to an imaginary component of the first complex signal, third data corresponding to a third traffic channel is spread using the second channelization code and the spread data is mapped to a real component of a second complex signal, fourth data corresponding to a fourth traffic channel is spread using the second channelization code is mapped to an imaginary component of the second complex signal, the method further comprising:
during the first time period, determining the first and second spreading factors;
during the second time period following the first time period, reading out first frame of composite spread data from the data memory at the second rate and despreading the readout data using the determined first spreading factor to generate a first despread complex signal;
extracting a first real component of the first despread complex signal and a first imaginary component of the first despread complex signal;
decoding the extracted first real component as the first data and the extracted first imaginary component as the second data;
despreading the readout data using the determined second spreading factor to generate a second despread complex signal;
extracting a second real component of the second despread complex signal and a second imaginary component of the second despread complex signal; and
decoding the extracted second real component as the third data and the extracted second imaginary component as the fourth data.

13. The method in claim 1, further comprising:
storing the composite spread data received from the transmitters in the data memory using a first sampling rate, and
reading out the frame of composite spread data from the data memory and reconstructing the frame of composite spread data at a second sampling rate that is higher than the first sampling rate.

14. The method in claim 13, further comprising:
extracting a start sample and a sampling phase from the reconstructed composite data to generate a downsampled signal at a third sampling rate lower than the first sampling rate for despreading.

15. The method in claim 14, wherein the composite data received from the transmitters is processed in multiple Rake fingers, the method further comprising:
when despreading data corresponding to a Rake finger having a sampling phase already available in the data memory, reading out data from the data memory and bypassing the reconstructing, extracting, and downsampling.

16. A receiver apparatus for processing a composite spread spectrum signal received over a communications interface from multiple transmitters, comprising:
a data memory for storing composite data received from the multiple transmitters in a data memory at a first rate corresponding to a rate at which the data is received over the communications interface;
first circuitry configured to determine for each transmitted signal during a first time period an actual spreading factor associated with a first frame of spread data for the transmitted signal which is included in a frame of composite spread data stored in the data memory; and
second circuitry configured to for each transmitted signal read out the frame of composite spread data from the data memory corresponding to the first frame of spread data for the transmitted signal during a second time period following the first time period at a second rate substantially greater than the first rate and to despread the readout data using the determined spreading factor.

17. The receiver apparatus in claim 16, wherein the first circuitry is configured to despread control information associated with the stored first frame of spread data during the first time period to determine the actual spreading factor associated with the first frame of spread data from the despread control information.

18. The receiver apparatus in claim 16, wherein the one or more transmitters are mobile radio terminals, the receiver apparatus is implemented in a radio base station, and the communications interface is an air or wireless interface.

19. The receiver apparatus in claim 16, wherein the receiver apparatus is implemented in a mobile radio terminal, and the communications interface is an air or wireless interface.

20. The receiver apparatus in claim 16, wherein the data memory is an addressable memory.

21. The receiver apparatus in claim 20, further comprising:
timing circuitry for determining a time when the first frame of spread data received from the transmitter is stored in the addressable memory at an addressable location, and
a controller configured to use the determined time as an address to read out the first frame of spread data from the addressable memory.

22. The receiver apparatus in claim 16, wherein the first circuitry is configured to extract the spreading factor from a transport format indicator included in the control information.

23. The receiver apparatus in claim 16, wherein the second circuitry includes:
multiple Rake despreading fingers for despreading the read out frame of composite spread data for each finger to generate multiple despread outputs associated with one of the transmitters;
a combiner for combining the multiple despread outputs into a single despread output corresponding to the one transmitter; and
a decoder for decoding the single despread output to generate data transmit by the one transmitter.

24. The receiver apparatus in claim 16, wherein second circuitry includes:
a single despreading and demodulating processor configured to perform the following tasks: (a) read out and despread a first fraction of the frame of composite spread data corresponding to a first Rake finger using a first Rake finger to generate a first Rake finger despread output, (b) store the first Rake finger despread output, and (c) read out and despreading a first fraction of the frame of composite spread data corresponding to a second Rake finger using the single despreading and demodulating processor to generate a second Rake finger despread output;
a combiner configured to perform the following tasks: (d) combine the first and second Rake finger despread first fraction outputs to generate a combined Rake finger despread first fraction output and (e) store the combined Rake finger despread first fraction output,
wherein the single despreading and demodulating processor is configured to perform the additional following tasks: (f) read out and despread the first fraction of the frame data corresponding to each remaining Rake finger using the single despreading and demodulating processor for each remaining Rake finger to generate a corresponding Rake finger despread first fraction output, and
wherein the combiner is configured to perform the additional following task: (g) combine each corresponding Rake finger despread first fraction output with the stored combined Rake finger despread output to generate a current combined Rake finger despread first fraction output;
wherein the single despreading and demodulating processor and the combiner are configured to repeat their respective tasks (a)-(g) for remaining fractions of the frame of composite spread data; and
a decoder for decoding the current combined Rake finger despread outputs for all the despread fractions.

25. The receiver apparatus in claim 16, wherein one of the transmitters is assigned two different channelization codes having a first spreading factor and a second spreading factor,
wherein during the first time period, the first circuitry is configured to determine the first and second spreading factors from the despread control information;
wherein during the second time period following the first time period, the second circuitry is configured to:
read out the frame of composite spread data from the data memory at the second rate and despread the readout data using the determined first spreading factor to generate first despread data and despread the readout data using the determined second spreading factor to generate second despread data; and
wherein the receiver apparatus includes a decoder for decoding the first and second despread data.

26. The receiver apparatus in claim 16, further comprising a decoder, wherein one of the transmitters uses quadrature multiplexing to modulate data to be transmitted as a complex signal where first data corresponding to a first traffic channel is spread using a spreading code and the spread data is mapped to a real component of the complex signal and second data corresponding to a second traffic channel is spread using the same spreading code is mapped to an imaginary component of the complex signal, wherein the second circuitry is configured to despread the read out data to generate a despread complex signal and extract a real component of the despread complex signal and an imaginary component of the despread complex signal, and wherein the decoder is configured to decode the extracted real component as the first data and the extracted imaginary component as the second data.

27. The receiver apparatus in claim 16, further comprising a decoder, wherein one of the transmitters is assigned first and second channelization codes having a first spreading factor and a second spreading factor, respectively, and wherein the one transmitter uses quadrature multiplexing to modulate data to be transmitted as a complex signal, where first data corresponding to a first traffic channel is spread using the first channelization code and the spread data is mapped to a real component of a first complex signal, second data corresponding to a second traffic channel is spread using the first channelization code is mapped to an imaginary component of the first complex signal, third data corresponding to a third traffic channel is spread using the second channelization code and the spread data is mapped to a real component of a second complex signal, fourth data corresponding to a fourth traffic channel is spread using the second channelization code is mapped to an imaginary component of the second complex signal, wherein during the first time period, the first circuitry is configured to determine the first and second spreading factors;

wherein during the second time period following the first time period, the second circuitry includes a first complex despreader and demodulator for reading out first frame spread data from the data memory at the second rate, despreading the readout data using the determined first spreading factor to generate a first despread complex signal, and extracting a first real component of the first despread complex signal and a first imaginary component of the first despread complex signal;

wherein the decoder is configured to decode the extracted first real component as the first data and the extracted first imaginary component as the second data;

wherein the second circuitry includes a second complex despreader and demodulator for reading out the first frame spread data again from the data memory at the second rate, despreading the readout data using the determined second spreading factor to generate a second despread complex signal, and extracting a second real component of the second despread complex signal and a second imaginary component of the second despread complex signal; and wherein the decoder is configured to decode the extracted second real component as the third data and the extracted second imaginary component as the fourth data.

28. The receiver apparatus in claim 16, wherein the data memory is configured to store the composite spread data received from the transmitter in the data memory using a first sampling rate, and the second circuitry is configured to read out the frame of composite spread data from the data memory and reconstruct the frame of composite spread data at a second sampling rate that is higher than the first sampling rate.

29. The receiver apparatus in claim 28, further comprising:

circuitry for extracting a start sample and a sampling phase from the reconstructed composite spread data to generate a downsampled signal at a third sampling rate lower than the first sampling rate for despreading.

30. The receiver apparatus in claim 29, wherein the composite spread data received from the transmitter is processed in multiple Rake fingers, the second circuitry being configured to despread data corresponding to a Rake finger having a sampling phase already available in the data memory, read out data from the data memory and bypass the reconstructing, extracting, and downsampling.

* * * * *

UNITED STATES PATENT AND TRADEMARK OFFICE
CERTIFICATE OF CORRECTION

| | |
|---|---|
| PATENT NO. | : 7,751,499 B2 |
| APPLICATION NO. | : 11/638701 |
| DATED | : July 6, 2010 |
| INVENTOR(S) | : Olsson et al. |

It is certified that error appears in the above-identified patent and that said Letters Patent is hereby corrected as shown below:

On the Title Page, Item (75), under "Inventors", Line 1, delete "Spanga" and insert -- Spånga --, therefor.

In Column 3, Line 62, delete "$SF_{actual}.$" and insert -- $SF_{actual}$ --, therefor.

In Column 4, Line 40, delete "$z_{\tau\text{-}T}$" and insert -- $z^{\tau\text{-}T}$, --, therefor.

In Column 5, Line 23, delete "The" and insert -- This --, therefor.

In Column 5, Line 50, delete "maximize" and insert -- maximum --, therefor.

In Column 16, Line 17, delete "$SF_{actual.1}$ and $SF_{actual.2}$" and insert -- $SF_{actual,1}$ and $SF_{actual,2}$ --, therefor.

In Column 17, Line 30, delete "per-despread" and insert -- pre-despread --, therefor.

Signed and Sealed this
Eleventh Day of January, 2011

David J. Kappos
*Director of the United States Patent and Trademark Office*

CERTIFICATE OF CORRECTION (continued)
U.S. Pat. No. 7,751,499 B2

In Column 17, in Table "2", delete "

| 2× SF2 |
|---|
| 450 |
| 900 |
| 1 800 |
| 3 600 |
| 7 200 |
| 14 400 |
| 28 800 |
| 57 600 |
| 115 200 |

" and insert --

| 2× SF2 |
|---|
| 300 |
| 600 |
| 1 200 |
| 2 400 |
| 4 800 |
| 9 600 |
| 19 800 |
| 38 240 |
| 76 800 |

--, therefor.